United States Patent
Kumai et al.

(10) Patent No.: US 8,014,381 B2
(45) Date of Patent: Sep. 6, 2011

(54) COMMUNICATION SYSTEM AND COMMUNICATION TERMINAL

(75) Inventors: Hisao Kumai, Ichikawa (JP); Suguru Toyokawa, Tokyo (JP); Toru Sugayama, Tokyo (JP)

(73) Assignee: Sharp Kabushiki Kaisha, Osaka (JP)

( * ) Notice: Subject to any disclaimer, the term of this patent is extended or adjusted under 35 U.S.C. 154(b) by 763 days.

(21) Appl. No.: 11/916,007

(22) PCT Filed: May 29, 2006

(86) PCT No.: PCT/JP2006/310660
§ 371 (c)(1),
(2), (4) Date: Nov. 29, 2007

(87) PCT Pub. No.: WO2006/129600
PCT Pub. Date: Dec. 7, 2006

(65) Prior Publication Data
US 2009/0310509 A1    Dec. 17, 2009

(30) Foreign Application Priority Data
Jun. 2, 2005  (JP) .................... 2005-162157

(51) Int. Cl.
*H04J 3/00* (2006.01)
*H04L 12/26* (2006.01)
*H04L 12/28* (2006.01)
(52) U.S. Cl. .................... 370/351; 370/464; 370/252
(58) Field of Classification Search .................. 370/231, 370/252, 310–350
See application file for complete search history.

(56) References Cited

U.S. PATENT DOCUMENTS

| | | | |
|---|---|---|---|
| 2002/0055999 A1* | 5/2002 | Takeda | 709/224 |
| 2004/0066759 A1* | 4/2004 | Molteni et al. | 370/329 |
| 2004/0121768 A1 | 6/2004 | Maki et al. | |
| 2004/0136318 A1* | 7/2004 | Bentley | 370/221 |
| 2004/0174853 A1 | 9/2004 | Saito et al. | |
| 2004/0202132 A1* | 10/2004 | Heinonen et al. | 370/331 |
| 2005/0018613 A1 | 1/2005 | Yokota | |
| 2005/0078633 A1* | 4/2005 | Watanabe et al. | 370/331 |
| 2006/0084417 A1 | 4/2006 | Melpignano et al. | |
| 2006/0182039 A1* | 8/2006 | Jourdain et al. | 370/252 |
| 2006/0183476 A1 | 8/2006 | Morita et al. | |
| 2006/0253888 A1* | 11/2006 | Senga et al. | 725/123 |
| 2007/0217448 A1* | 9/2007 | Luo et al. | 370/468 |
| 2007/0248065 A1* | 10/2007 | Banerjea et al. | 370/338 |

(Continued)

FOREIGN PATENT DOCUMENTS

JP    2004-179958 A    6/2004

(Continued)

*Primary Examiner* — Warner Wong
(74) *Attorney, Agent, or Firm* — Birch, Stewart, Kolasch & Birch, LLP

(57) ABSTRACT

The present invention provides a communication system and a communication method for linking the switching of a transmission path with the switching of an application according to the change of a communication condition caused by the movement of a user in a mobile environment. A change of the communication condition caused by the movement of the user is always monitored and the transmission path is switched according to the state change of the transmission path. Here, the state of the transmission path between the terminal and the communication counter part terminal is obtained and compared to a priority reference for each of the applications, thereby selecting a transmission path appropriate for the application becomes possible and a service in corresponding to the communication condition can be provided by changing a content to that appropriate for the transmission path, simultaneously.

15 Claims, 15 Drawing Sheets

U.S. PATENT DOCUMENTS

2008/0170550 A1 * 7/2008 Liu et al. .................. 370/338

FOREIGN PATENT DOCUMENTS

| JP | 2004-266330 A | 9/2004 |
| JP | 2004-272563 A | 9/2004 |
| JP | 2004-357123 A | 12/2004 |
| JP | 2004-357213 A | 12/2004 |
| JP | 2005-123993 A | 5/2005 |
| JP | 2005-136553 A | 5/2005 |
| WO | WO-2004/008693 A1 | 1/2004 |

* cited by examiner

FIG.6

| NAME OF NIC | NIC1 |
|---|---|
| IP ADDRESS | xx.xx.xx.xx |
| NAME OF COMMUNICATION CARD | IEEE802. 11b |
| TRANSMISSION SPEED (STANDARD VALUE) | 11Mbps |
| STATE OF LINKS | ON |
| LINK STATE FLAG | 1 |
| RADIO WAVE INTENSITY | LEVEL 3 |
| MODULATION METHOD | QPSK |
| FEE | FIXED CHARGE |
| MTU | 1480 |
| MOBILITY | LEVEL 3 |
| STABILITY | LEVEL 2 |

| CONNECTION INFORMATION | CONNECTION DESTINATION IP ADDRESS |
| --- | --- |
| | PORT NUMBER |
| | SESSION ID |
| | ... |
| CONTENTS INFORMATION | VIDEO IMAGES/SOUND CODED PARAMETER |
| | TRANSMISSION/RECEPTION PROTOCOL |
| | ... |

(B)

| | CONTENTS QUALITY | BANDWIDTH |
| --- | --- | --- |
| CONTENTS 1 | LEVEL 1 | 64kbps |
| CONTENTS 2 | LEVEL 2 | 256kbps |
| CONTENTS 3 | LEVEL 3 | 1Mbps |
| ... | ... | ... |

(C)

| APPLICATION ID | ×××  |
| --- | --- |
| PRIORITY NIC | NIC1 |
| BAND PRIORITY | ON/OFF |
| DELAY PRIORITY | ON/OFF |
| REQUESTED BAND | 256kbps |
| REQUESTED DELAY | 1ms |
| COST | FIXED CHARGE |
| PERMISSIBLE BAND PRIORITY | LEVEL 4 |
| PERMISSIBLE DELAY PRIORITY | LEVEL 2 |
| PERMISSIBLE COST PRIORITY | LEVEL 5 |
| MOBILITY | LEVEL 3 |
| STABILITY | LEVEL 3 |
| COMMUNICATION RELIABILITY | LEVEL 3 |

| NAME OF NIC | IP ADDRESS |
|---|---|
| NIC1 | xx.xx.xx.xx |
| NIC2 | xx.xx.xx.xx |
| ... | ... |
| NICn | xx.xx.xx.xx |

(B)

| TRANSMISSION PATH No. | TRANSMISSION ORIGIN ADDRESS | TRANSMISSION ORIGIN NIC | TRANSMISSION DESTINATION ADDRESS | TRANSMISSION DESTINATION NIC |
|---|---|---|---|---|
| TRANSMISSION PATH 1 | aa.bb.cc.dd | NIC1 | xx.yy.zz.ww | NIC4 |
| TRANSMISSION PATH 2 | | | ww.xx.yy.xx | NIC5 |
| TRANSMISSION PATH 3 | bb.cc.dd.aa | NIC2 | xx.yy.zz.ww | NIC4 |
| TRANSMISSION PATH 4 | | | ww.xx.yy.xx | NIC5 |
| TRANSMISSION PATH 5 | dd.aa.cc.bb | NIC3 | xx.yy.zz.ww | NIC4 |
| TRANSMISSION PATH 6 | | | ww.xx.yy.xx | NIC5 |
| TRANSMISSION PATH 7 | xx.yy.zz.ww | NIC4 | aa.bb.cc.dd | NIC1 |
| TRANSMISSION PATH 8 | | | bb.cc.dd.aa | NIC2 |
| TRANSMISSION PATH 9 | | | dd.aa.cc.bb | NIC3 |
| TRANSMISSION PATH 10 | ww.xx.yy.xx | NIC5 | aa.bb.cc.dd | NIC1 |
| TRANSMISSION PATH 11 | | | bb.cc.dd.aa | NIC2 |
| TRANSMISSION PATH 12 | | | dd.aa.cc.bb | NIC3 |

FIG.9
(A)
| | |
|---|---|
| TRANSMISSION PATH INFORMATION | TRANSMISSION PATH No. |
| | TRANSMISSION ORIGIN ADDRESS |
| | TRANSMISSION ORIGIN NIC |
| | TRANSMISSION DESTINATION ADDRESS |
| | TRANSMISSION DESTINATION NIC |
| TRANSMISSION PATH STATE | BOTTLENECK PHYSICAL BANDWIDTH |
| | RTT DELAY DIFFERENCE |
| | AVAILABLE BANDWIDTH |
| | PACKET LOSS RATE |
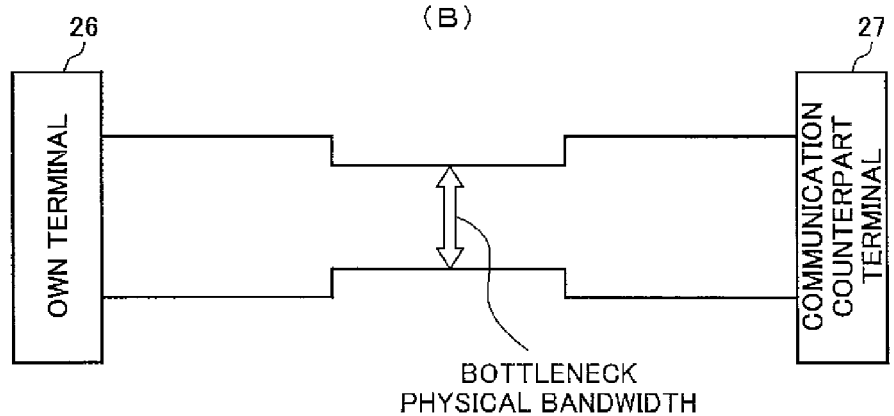
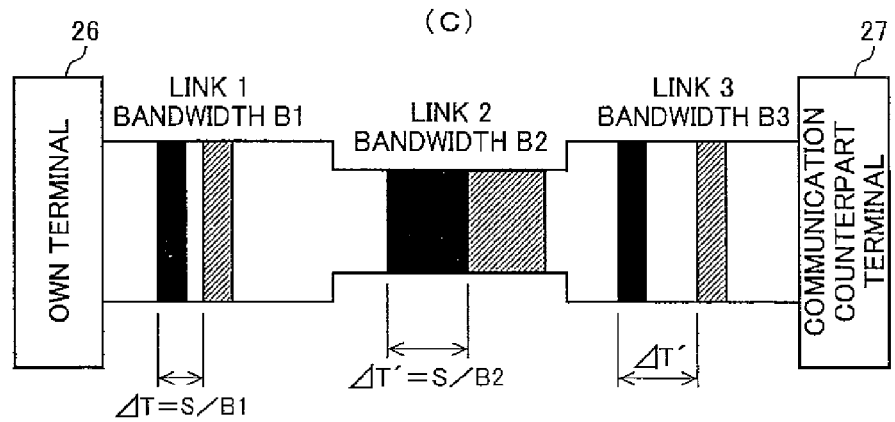

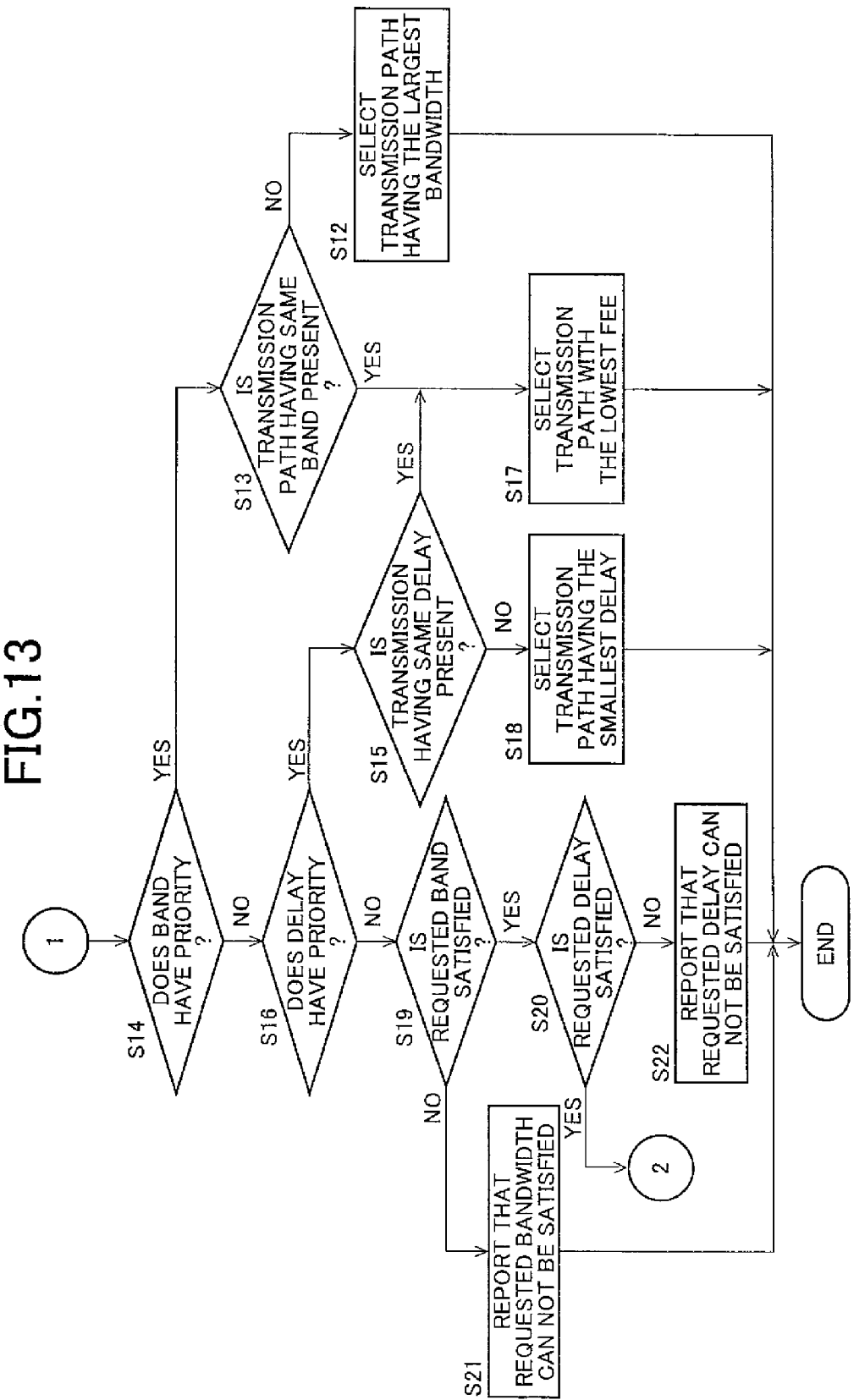

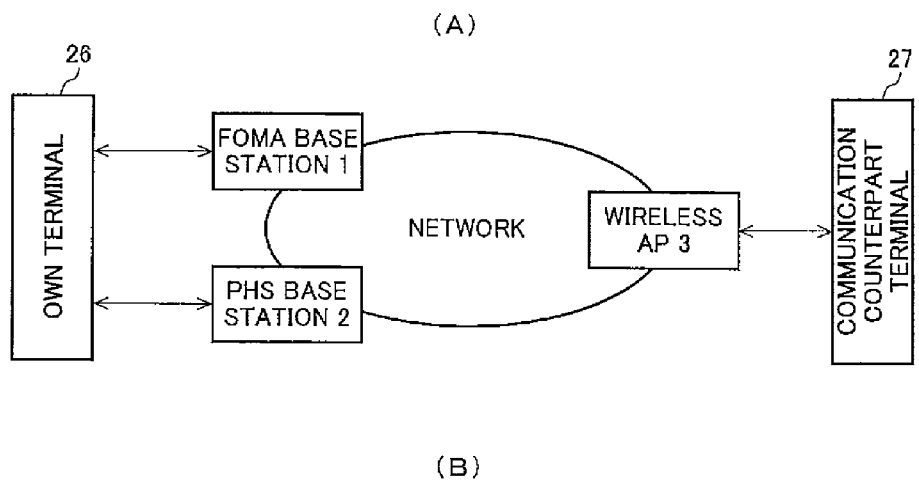

(B)

| IP ADDRESS | xx.yy.zz.ww | yy.xx.bb.zz | xx.xx.xx.xx |
|---|---|---|---|
| NAME OF COMMUNICATION CARD | FOMA | PHS | IEEE802.11b |
| TRANSMISSION SPEED (UPLINK) | 64kbps | 64kbps | 11Mbps |
| TRANSMISSION SPEED (DOWNLINK) | 384kbps | 64kbps | 11Mbps |
| LINK STATE | ON | ON | ON |
| LINK STATE FLAG | 1 | 1 | 1 |
| FEE | MEASURED CHARGE | FIXED CHARGE | FIXED CHARGE |

(C)

| TRANSMISSION PATH No. | TRANSMISSION ORIGIN ADDRESS | TRANSMISSION ORIGIN NIC | TRANSMISSION DESTINATION ADDRESS | TRANSMISSION DESTINATION NIC | BOTTLENECK PHYSICAL BANDWIDTH |
|---|---|---|---|---|---|
| TRANSMISSION PATH 1 | xx.yy.zz.ww | FOMA | xx.xx.xx.xx | IEEE802.11b | 64kbps |
| TRANSMISSION PATH 2 | yy.xx.bb.zz | PHS | xx.xx.xx.xx | IEEE802.11b | 64kbps |
| TRANSMISSION PATH 3 | xx.xx.xx.xx | IEEE802.11b | xx.yy.zz.ww | FOMA | 384kbps |
| TRANSMISSION PATH 4 | xx.xx.xx.xx | IEEE802.11b | yy.xx.bb.zz | PHS | 64kbps |

FIG.15

| APPLICATION ID | ×××  |
|---|---|
| PRIORITY NIC | NONE |
| PRIORITY BAND | ON |
| COST | MEASURED CHARGE |

| NAME OF NIC | IP ADDRESS |
|---|---|
| NIC6 | xx.xx.xx.xx |

(B)

| TRANSMISSION PATH No. | TRANSMISSION ORIGIN ADDRESS | TRANSMISSION ORIGIN NIC | TRANSMISSION DESTINATION ADDRESS | TRANSMISSION DESTINATION NIC |
|---|---|---|---|---|
| TRANSMISSION PATH 13 | ff.aa.cc.dd | NIC6 | xx.yy.zz.ww | NIC4 |
| TRANSMISSION PATH 14 | | | ww.xx.yy.xx | NIC5 |

(C)

| NAME OF NIC | TRANSMISSION SPEED (STANDARD VALUE) |
|---|---|
| NIC1 | 5.5Mbps |

COMMUNICATION SYSTEM AND COMMUNICATION TERMINAL

TECHNICAL FIELD

The present invention relates to a communication system and a communication terminal that are used in a mobile network system including communication terminals which have various kinds of wireless communicating means and that provide users with communication programs that execute communication through various kinds of networks and conversational or streaming application services.

BACKGROUND OF THE INVENTION

With the recent progress of the wireless technology, connections to the Internet in various wireless communication systems have been prevailed and a mobile communication environment in a mobile environment has been provided utilizing the advantages of the wireless. As a portable terminal, function has been progressed and one terminal device can connect to a different types of networks (for example, a wireless LAN (Local Area Network), a wired LAN, a portable telephone network, a PHS (Personal Handy Phone system) network. Thereby, one terminal device can connect to various types of network and, for every use, the optimal communication environment can be selected.

Because of the emergence of techniques (such as Mobile IPv6 and Lin6) that enable a continuous service in a wireless communication between different networks, it is becoming possible to receive a service without interruption even when the communication is switched by selecting an optimal communication environment for each use. A technique has been proposed that varies the quality of receive data corresponding to a change of the state of communication involved in the switching between networks through which the wireless communication is executed (see, for example, Patent Document 1).

On the other hand, a wireless data communication executed while moving is unstable because a radio wave intensity varies or the communication is interrupted due to the movement, or the transmission bandwidth considerably changes when moving into a different wireless network. A method has been proposed of executing control of the network switching and control of data quality by providing a means of notifying an upper layer of the above mentioned lower-layer information (see Patent Document 2).

Patent Document 1: Japanese Laid-Open Patent Publication No. 2004-272563
Patent Document 2: Japanese Laid-Open Patent Publication No. 2004-266330

DISCLOSURE OF THE INVENTION

Problems to be Solved by the Invention

However, according to the technique disclosed in the above Patent Document 1, it is not considered to dynamically obtain the state of communication (the state of a transmission path between communication terminals) at the time when the control of the network switching is executed for all network interfaces available for communication. Therefore, depending on the actual state of the communication, a case can be considered where switching of networks is needed again. Depending on an application used, a parameter that is a priority criterion may differ. It is assumed that requirements for parameters to determine the priority differ depending on applications, for example, the wider of an available bandwidth, the better for video image streaming; and for VoIP (Voice over Internet Protocol), the higher priority of RTT (Round Trip Time), the better and not so wide bandwidth is required.

According to the technique disclosed in the above Patent Document 2, information on the state of communication in a wireless network (the radio wave intensity, the modulation method, the state of congestion in wireless communication, the network prefix, the receiving buffer size, etc.) can be obtained. However, for a network for which it is assumed that a network environment where any portions other than the last one hop are a bottleneck is mixed, it is necessary to obtain End-to-End transmission path information between communication terminals. An example of the above transmission path can be those that are represented by use of a wireless LAN as an ADSL service that is recently prevailing in homes.

For the above transmission path, an ADSL portion in the path may be a bottleneck for a transmission bandwidth. A transmission path having bandwidths of uplink and downlink communications are asymmetrical for ADSL and high speed wireless communication (FOMA, CDMA2000, etc.) may be used. In this case, the state of the transmission path may differ between the uplink communication and the downlink communication. When two-way communication is taken into account, it is also necessary to select different transmission paths to be used respectively for the uplink communication and the downlink communication.

The present invention is to provide a communication system to efficiently solve the above various problems.

Means for Solving the Problems

A communication system of the present invention is a communication system including a communication terminal that has a network interface capable of being connected to multiple transmission paths and uses multiple transmission paths, wherein between each communication terminal, communication terminals: detect network interfaces ready for communication of the multiple network interfaces; obtain network interface information on predetermined attributes of the multiple network interfaces; make a list of transmission paths presenting between the network interface ready for communication and that of a communication counterpart; obtain information on the state of transmission paths corresponding to the transmission path list; judge the priority of the transmission path based on either of the network interface information and the information on the transmission path; determine a transmission path; and execute data communication through the determined transmission path. The communication system transmits information from a communication terminal of a transmission side to the transmission path by specifying one of network interfaces of the communication counterpart terminal as an address, by specifying one of network interfaces of a communication terminal of the transmission side to execute data transmission using the selected transmission path when the combination of the transmission path was selected by the transmission path list. Meanwhile, the state of the transmission path is obtained by transmitting/ receiving using a probe packet between communication terminals.

The network interface information includes the state of the communication detected in a layer that is lower than a transport layer and, for example, a network interface transmission speed that differs for each of the uplink communication and the downlink communication, the radio wave intensity of the wireless communication, and the state of each link of the network interface are used. The information on the transmission path includes a bottleneck physical bandwidth, an available bandwidth, the RTT, the communication cost between the network connected to multiple network interfaces and the communication counterpart. Determination of the priority of the network interface is judged based on the priority criteria set for each application program that executes the data communication and, when an asymmetrical communication network having different transmission path characteristics for each of the uplink and downlink communication is included, different transmission paths respectively for the uplink and downlink communications can be selected according to the priority criteria. When a requested bandwidth is used for the priority criteria, multiple requested bandwidths are set for each application program.

As to the data type of the data communication, the quality of the contents is determined, by referring to the quality information set for each application program and the information on the transmission path for the determined transmission path, based on those pieces of information. After the data communication, when the state of network interfaces not in communication and the state of the transmission path of the transmission path being used, and the modulation method are varied, the priority of each transmission path is judged and the transmission path is switched to a transmission path having the highest priority.

Effect of the Invention

According to the present invention, a communication system between communication terminals that includes a mobile terminal having multiple network interfaces in a communication environment that is varied moment by moment along with the move of a user can select more appropriate transmission path corresponding to the priority criteria set for each application or the preference of a user when the data communication is executed by an application using communication by video images and voices, etc. In addition, the network system can provide services having the quality corresponding to the place of the communication terminal by selecting contents having the quality that matches with the network information. During the data communication, the network system can provide services with the quality optimum for the communication environment of the place where the communication terminal is installed even in the communication environment that is varied moment by moment, by obtaining again the state of the transmission path according to the variation of the communication state of the transmission path and selecting again a transmission path corresponding to the priority criteria set for each application or the preference of a user.

BRIEF DESCRIPTION OF THE DRAWINGS

FIG. 1 is a view of an exemplary entire configuration of a network that this embodiment can be applied to.

FIG. 2 is a conceptual view of accessible areas respectively corresponding to base stations of wireless networks that the embodiment can be applied to.

FIG. 6 is a view of an example of a network interface information table in the embodiment.

In FIG. 7, (A) shows an example of a communication information notice format, (B) shows an example of a quality information table, and (C) shows an example of items in an application priority criteria table, in the embodiment.

In FIG. 8, (A) shows an example of a network interface list, and (B) shows an example of a transmission path list, in the embodiment.

In FIG. 9, (A) shows an example of a transmission path information table, (B) shows an overview of a bottleneck physical bandwidth, and (C) shows an example of a method of measuring a bottleneck physical bandwidth, in the embodiment.

FIG. 13 is a flowchart of the example of the processing procedure of selection of a transmission path in the embodiment continued from FIG. 12.

In FIG. 14, (A) shows an example for the case where different transmission paths are selected respectively for uplink and downlink communication, (B) shows another example of the network interface information table, and (C) shows another example of the transmission path information table, in the embodiment.

FIG. 15 shows another example of the application priority criteria table in the embodiment.

In FIG. 16, (A) shows another example of the network interface information to be reported, (B) shows an example of a list of transmission paths added, and (C) shows another example of the network interface information to be reported of, in the embodiment.

EXPLANATION OF REFERENCE NUMERALS

10 . . . communication terminal, 11 . . . application portion, 12 . . . user setting portion, 13 . . . communication control portion, 14 . . . contents control portion, 15 . . . application priority criteria table, 16 . . . quality information table, 17 . . . transmission path control portion, 18 . . . transmission path managing portion, 19 . . . transmission path selecting portion, 20 . . . IP control portion, 21 . . . transmission path information table, 22 . . . network interface information table, 23 . . . transmission path state managing portion, 24 . . . network interface managing portion, 25 . . . network interface card (NIC), 26 . . . communication terminal, 27 . . . communication counterpart terminal, 28 . . . network.

PREFERRED EMBODIMENTS OF THE INVENTION

Figure 1:
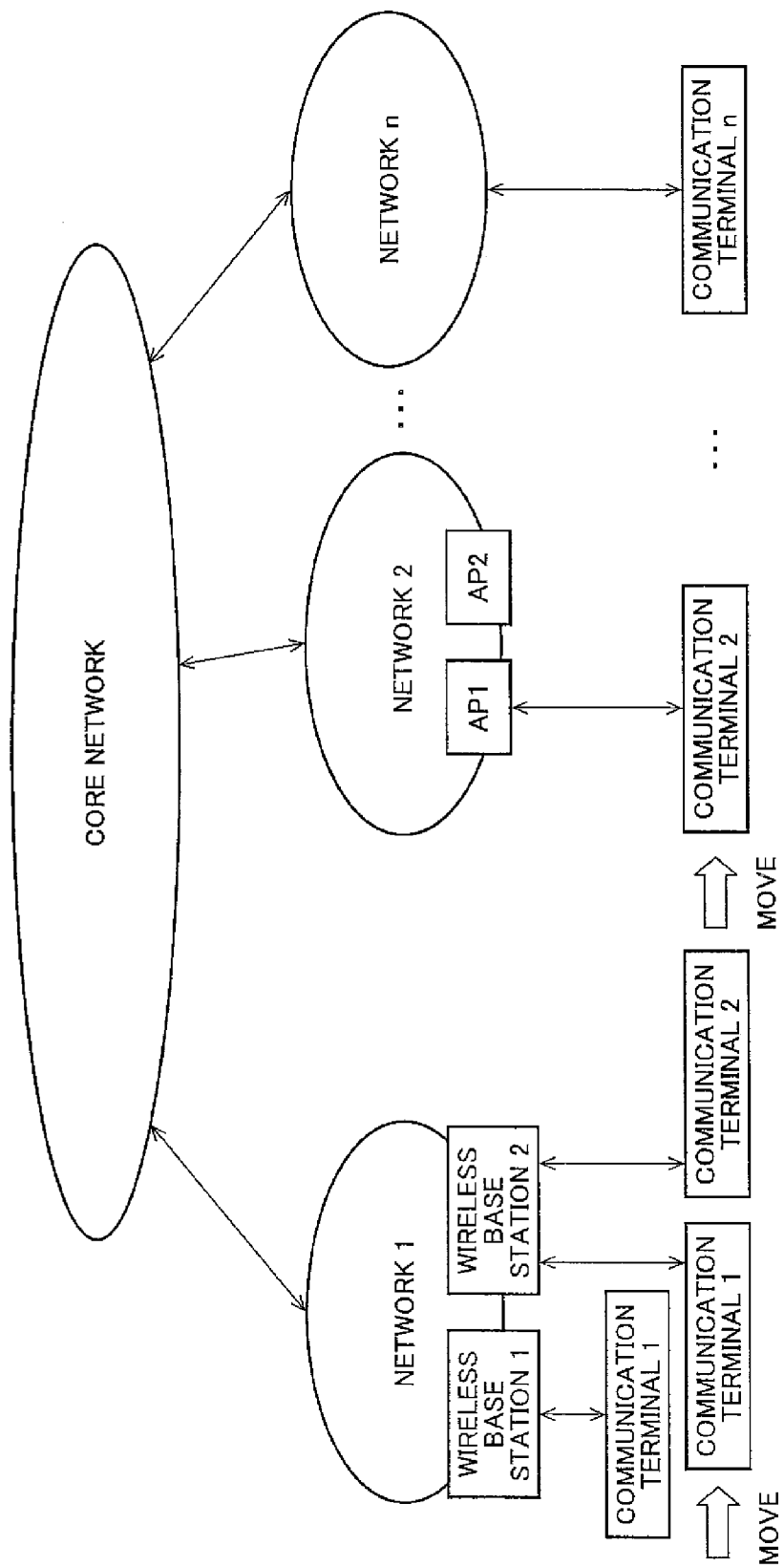
Figure 2:
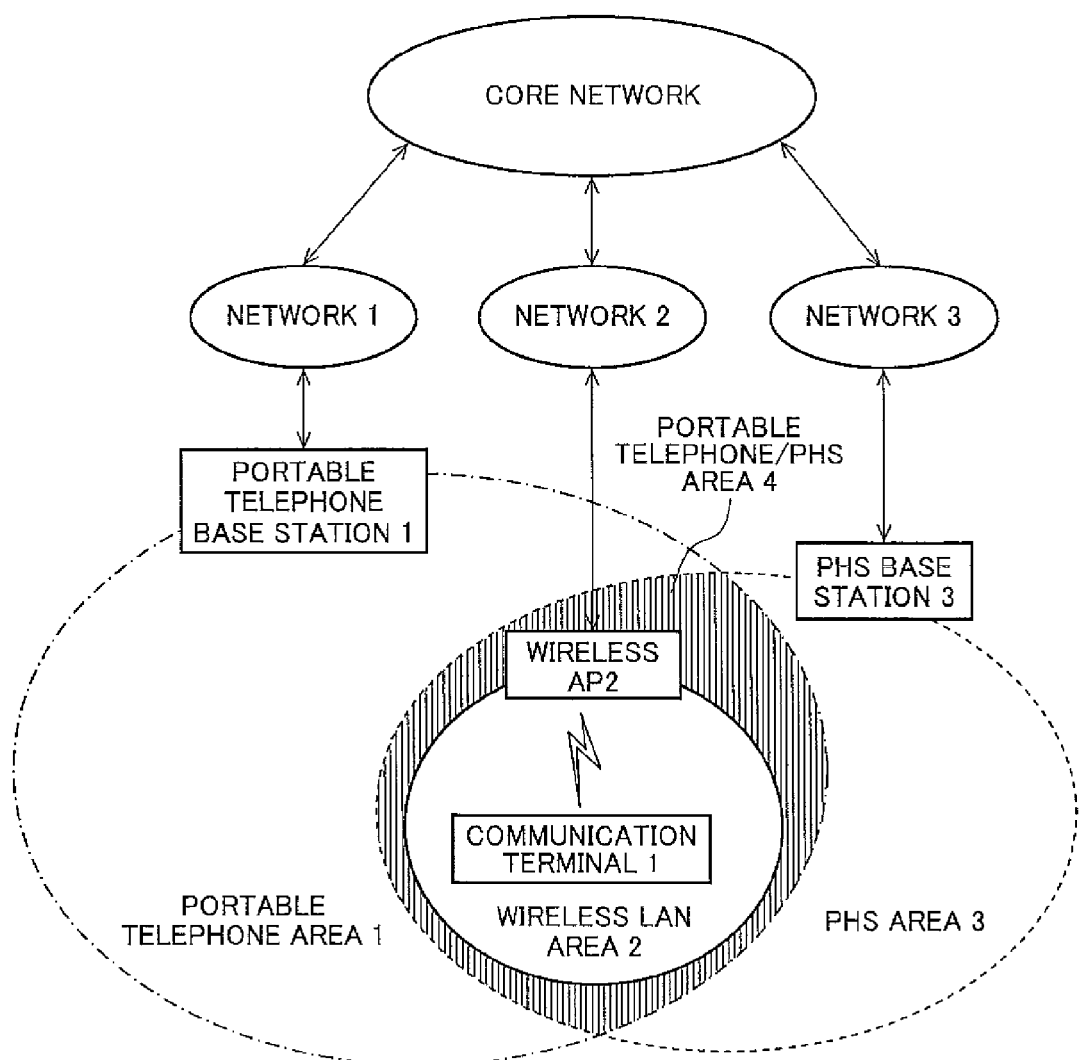

Referring to FIGS. 1 and 2, description will be given for the entire configuration of a wireless network that a communication system according to the present invention is applied to and accessible areas thereof.

In FIG. 1, networks 1 to n are networks each being of a network segment such as a LAN or a WAN. For example, the network 1 can include multiple wireless base stations and the network 2 can include multiple wireless access points (APs). That is, each of the networks 1 to n is, for example, a public portable telephone network, a private wireless LAN, a hot spot, or a home wireless network and, herein, is assumed to be an IP-based network. These networks each being of a network segment are connected to a core network represented by the Internet.

The communication terminals 1 to n execute communication for video images and sound between one to one, or among multiple terminals. For example, even when the communication terminal 1 is moved and, thereby, the state of the communication is shifted from the state where the communication terminal 1 receives a radio wave from the wireless base station 1 to the state where the communication terminal 1 receives radio wave from the wireless base station 2, handing over is executed between the wireless base stations 1 and 2 and, thereby, the communication terminal 1 can also continuously execute the communication that has been executed before the move thereof even after the move thereof. The same procedure as above is also taken when one of the communication terminals 1 to n moves from the connection coverage of the wireless access point AP1 to the connection coverage of the wireless access point AP1. For handing over between the wireless access points, handing over of authenticating information may be employed in parallel thereto.

Even when the communication terminal moves across network segments, hand-over in a network layer is executed and, thereby, the communication can be continuously executed. For example, it is assumed that the communication terminal 2 moves and, thereby, the state of the communication is shifted from the state where the communication terminal 2 is connected to the wireless base station 2 to the state where the communication terminal 2 is connected to the wireless access point AP1. Even in this case, when the communication terminal 2 includes a network interface card (NIC) that enables connection to each of the wireless base station 2 and the wireless access point AP1 and an IP control portion, described later, supports, for example, mobile IP (IETF: Internet Engineering Task Force) RFC3775, an application portion can continue the communication processing regardless of the move to a different network.

For the hand-over between the network segments, a technique according to which an IP control portion supports Lin6 (IETF Fraft-Teraoka-ipng-Lin6-01), a technique according to which a communication control portion supports hand-over executed maintaining a session, or a technique that realizes a similar function may be employed. For the move between the network segments, even when the wireless access point AP1 and the wireless access point AP2 are respectively constituted by different network segments, the communication can be continuously executed by using the above described hand-over techniques even when the communication is handed over between the above described wireless access points.

FIG. 2 is a conceptual view of accessible areas respectively corresponding to wireless base stations and wireless access points. In FIG. 2, networks 1 to 3 are respectively networks each being of a network segment such as a LAN or a WAN. A portable telephone base station 1 is connected to the network 1. A wireless AP 2 is connected to the network 2. A PHS base station 3 is connected to the network 3. These networks each being of a network segment are IP-based networks and each of them is connected to a core network similarly to the connection shown in FIG. 1.

As to each accessible area: the portable telephone base station 1 covers a portable telephone area 1; the wireless AP2 covers a wireless LAN area 2; and the PHS base station 3 covers a PHS area 3. When the communication terminal 1 is in one of these areas, the communication terminal 1 can communicate according to a wireless communication method used in the area. The communication terminal 1 includes an NIC that enables connection to the portable telephone base station 1, the wireless AP2, and the PHS base station 3. In the wireless LAN area 2, the communication terminal 1 can be connected to the networks 1 to 3 respectively through the portable telephone base station 1, the wireless AP2, and the PHS base station 3.

Similarly, in a portable telephone/PHS area 4, the communication terminal 1 can be connected to networks 1 and 3 respectively through the portable telephone base station 1 and the PHS base station 3 and, in a portable telephone area 1 excluding the portable telephone/PHS area 4, as described above, the communication terminal 1 can be connected only to the network 1 through the portable telephone base station 1. In the PHS area 3 excluding the portable telephone/PHS area 4, the communication terminal 1 can be connected only to the network 3 through the PHS base station 3. For example, when the communication terminal 1 moves from the wireless LAN area 2 to the portable telephone/PHS area 4 and, thereby, the state of communication is changed from the state where the communication terminal 1 in the wireless LAN area 2 is connected to the network 2 through the wireless AP2 to the state where the communication terminal 1 is connected to the network 3 through the PHS base station 3, the communication can be continued by applying the technique such as the above described mobile IP because this move is a move between the network segments.

When the network 1 is selected by an application used in the communication terminal 1 because the network 1 is more suitable, the communication terminal 1 can also be connected to the network 1 through the portable telephone base station 1. Similarly, when the communication terminal 1 moves from the portable telephone/PHS area 4 where it is connected to the network 3 through the PHS base station 3 to the portable telephone area 1 where the communication terminal 1 can be connected only to the portable telephone base station 1, or when the communication terminal 1 moves from the portable telephone/PHS area 4 where it is connected to the network 1 through the portable telephone base station 1 to the PHS area 3 where the communication terminal 1 can be connected only to the PHS base station 3, the communication can also be continued by applying the techniques such as the above described mobile IP and the like.

In the wireless LAN area 2, because the communication terminal 1 can be connected to the networks 1 to 3 respectively through the portable telephone base station 1, the wireless AP2, and the PHS base station 3, a suitable network is selected by the application used in the terminal 1. Though the portable telephone and the PHS wireless LAN are taken as the wireless communication system herein, any system may be used for the wireless communication system that can provide an IP-based network such as Bluetooth that is for short distance communication and IMT (International Mobile Telecommunication)-2000 that is a wideband portable communication system.

Following are considered as communication schemes; 1) The case where a communication terminal on the transmission side is movable and a communication terminal is fixed to a network on the reception side, 2) The case where a communication terminal is fixed to a network on the transmission side and a communication terminal on the reception side is movable, and 3) The case where communication terminals (the communication terminals 1 and 2) are movable on both of the transmission side and the reception side. In these cases, control of the application corresponding to the switching among transmission paths can be executed by applying the present invention to the communication terminals respectively on the transmission side and the reception side.

Figure 3:
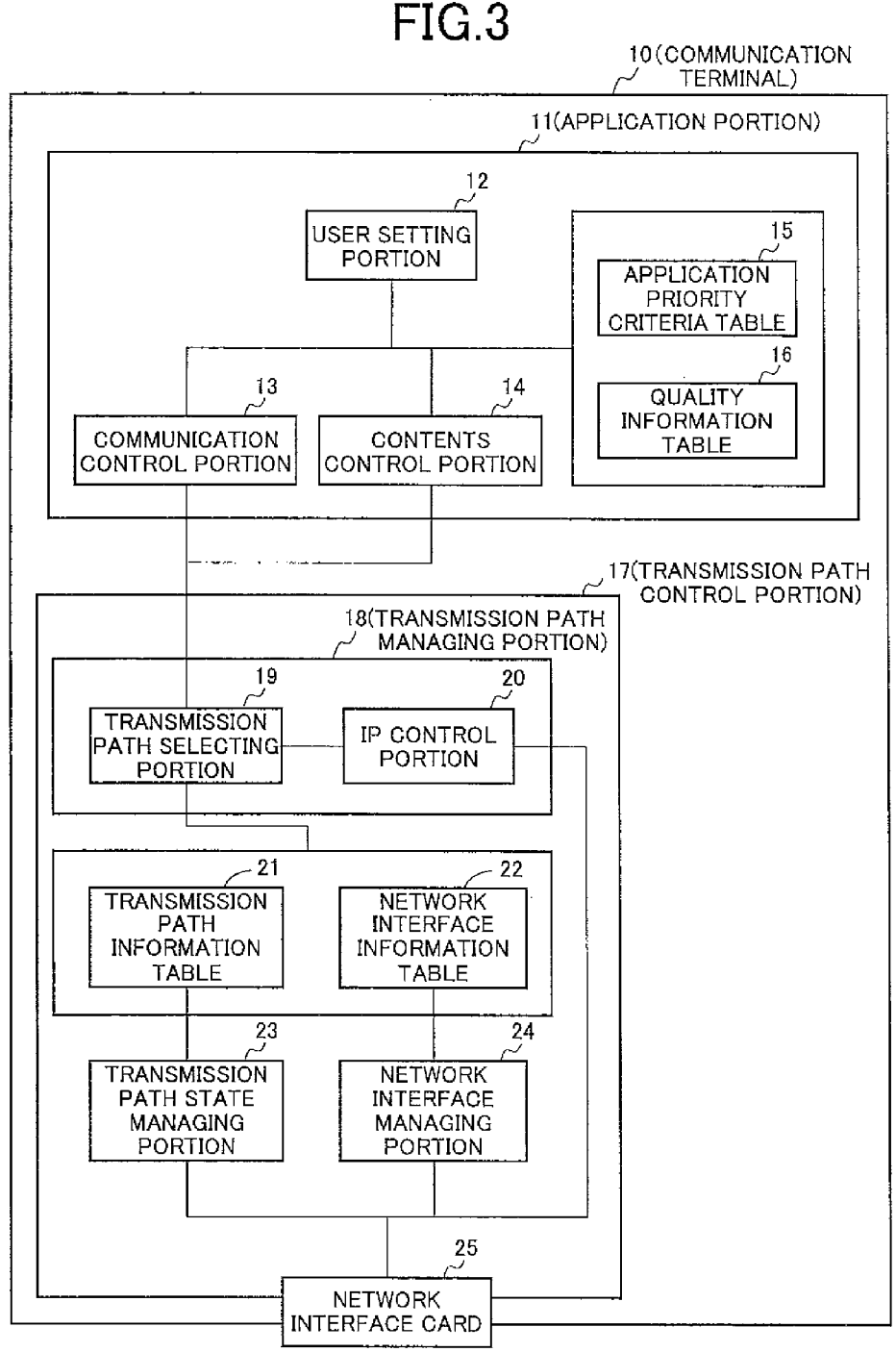
FIG. 3 is a functional block diagram showing an exemplary internal configuration of a communication terminal according to the present invention.
Figure 4:
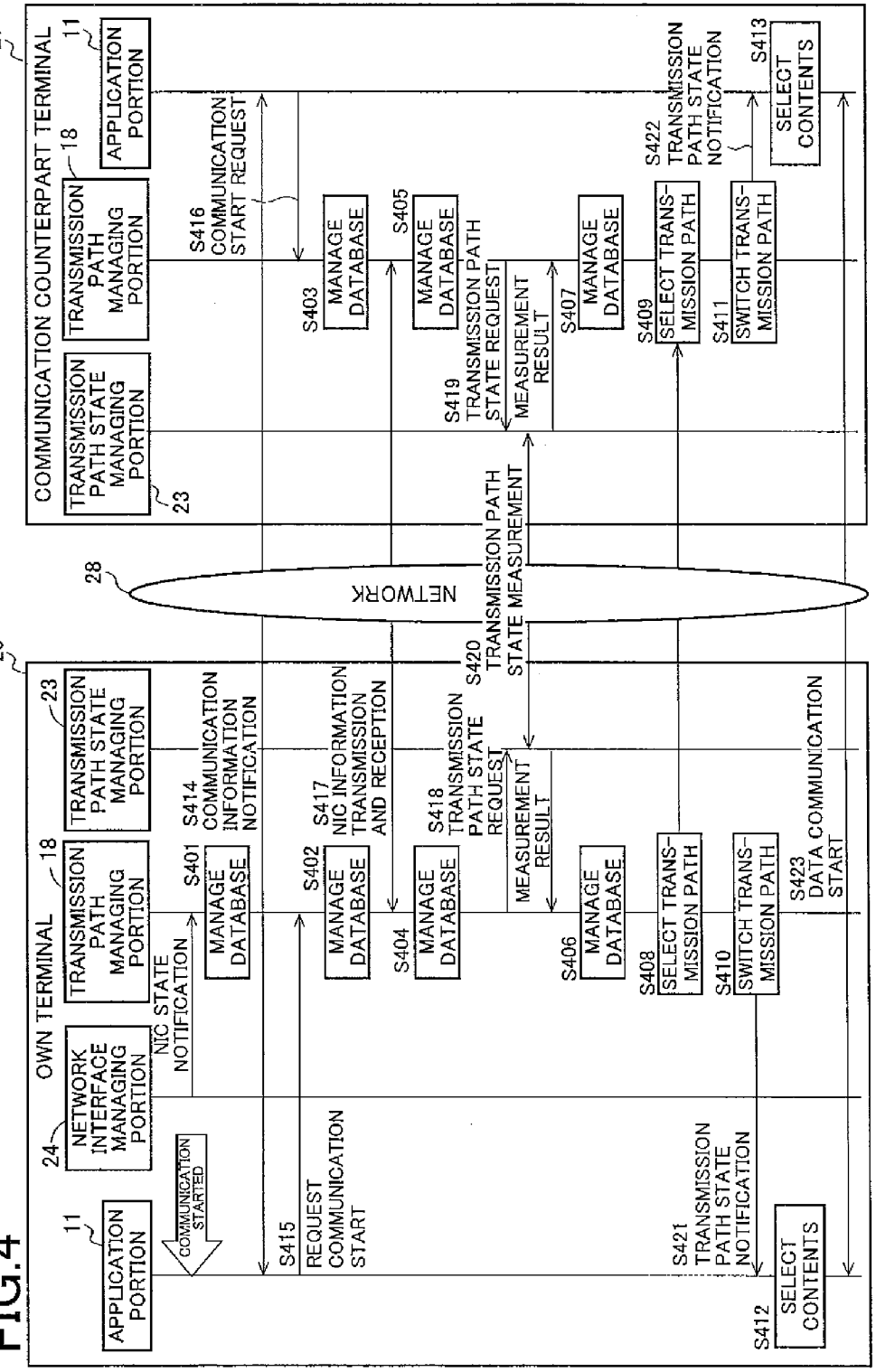
FIG. 4 is an operation sequence chart showing operations respectively of portions executed when a communication terminal 10 starts communication.
Figure 5:
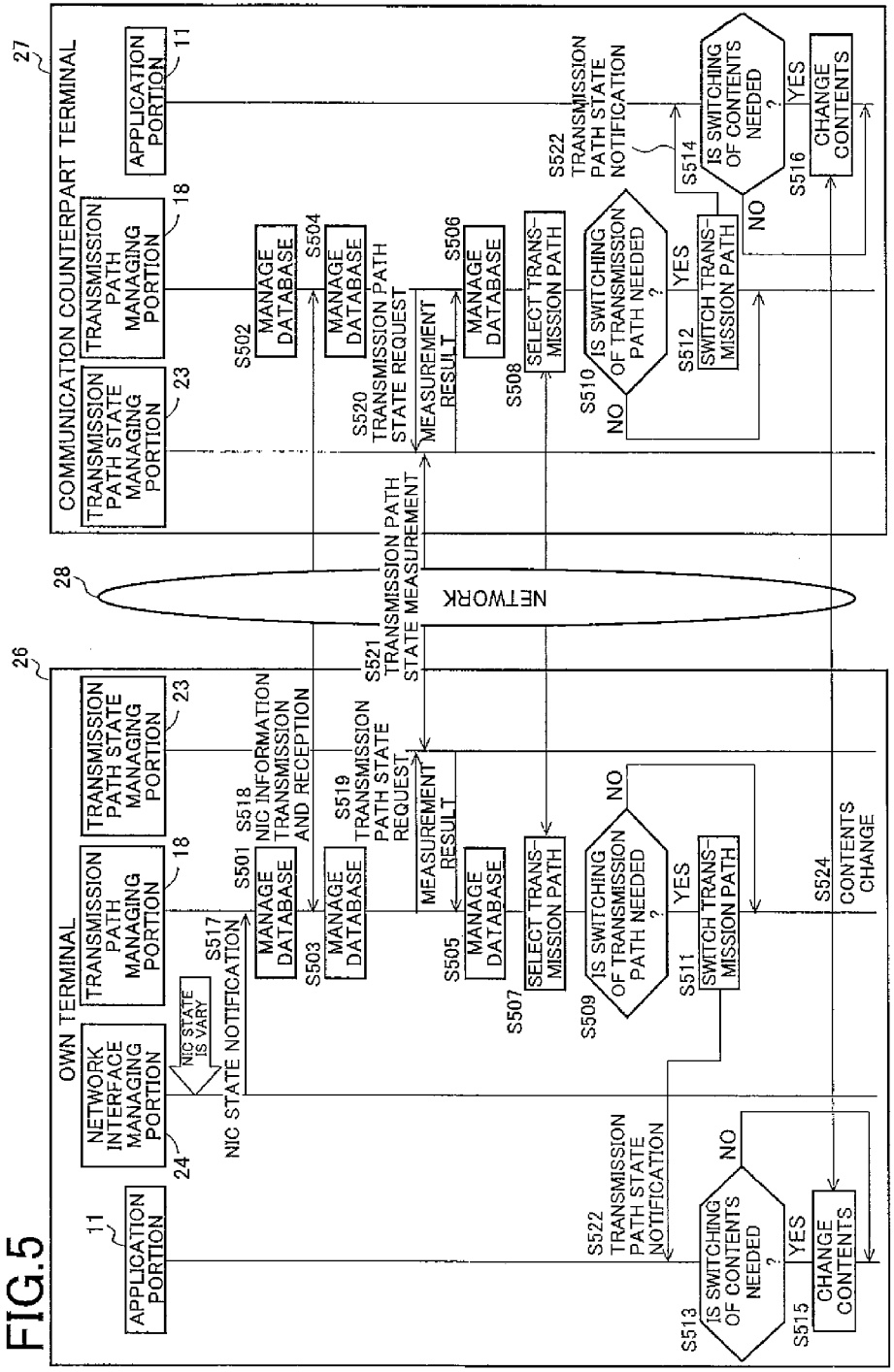
FIG. 5 is a sequence chart showing operations respectively of portions executed when the state of communication of a network interface card of the communication terminal 10 is varied.

Description will be given for an embodiment according to the present invention. FIG. 3 is a functional block diagram showing an exemplary internal configuration of a communication terminal according to the present invention. FIG. 4 is an operation sequence chart showing operations executed when communication is started. FIG. 5 is a chart showing an operation sequence executed when the state of communication of a network interface card is varied.

In these drawings, "10" denotes a communication terminal, "11" denotes an application portion, "12" denotes a user setting portion, "13" denotes a communication control portion, "14" denotes a contents control portion, "15" denotes an application priority criteria table, "16" denotes a quality information table, "17" denotes a transmission path control portion, "18" denotes a transmission path managing portion, "19" denotes a transmission path selecting portion, "20" denotes an IP control portion, "21" denotes a transmission path information table, "22" denotes a network interface information table, "23" denotes a transmission path state managing portion, "24" denotes a network interface managing portion, "25" denotes a network interface card (NIC), "26" denotes a communication terminal, "27" denotes a communication counterpart terminal, and "28" denotes a network.

A communication terminal 10 used in a communication system of the present invention comprises: an application portion 11 that executes transmission, reception, and processing of actual communication data; and a transmission path control portion 17 that executes management and control of the state of a network interface card 25 and the state of transmission paths. The communication terminal 10 may be a terminal that includes multiple wireless communication means such as a portable telephone terminal, a PDA (Personal Digital Assistance) that can be connected to a wireless network, or a personal computer.

The application portion 11 is included in an application program, receives a service start request from a user, and transmits application request information to the transmission path control portion 17 based on the service definition information and the application priority criteria table 15. The transmission path control portion 17 is included in the application program or is used by the application program. Receiving the application request information from the application portion 11, the transmission path control portion 17 determines a transmission path using the transmission path selecting portion 19 based on the application request information from the application portion 11, network interface information obtained by the network interface managing portion 24, and transmission path information obtained by the transmission path state managing portion 23.

The transmission path selecting portion 19 transfers the information on the selected transmission path to the application portion 11. Receiving this information, the contents control portion 14 refers to the quality information table 16, determines contents, and, by transmitting/receiving data using the communication control portion 13, provides the service. Each portion of the communication terminal may be realized by any one of hardware, software, or a combination of these.

Description will be given in detail for each portion of the above described communication terminal. The network interface managing portion 24 manages a network interface card (hereinafter, "NIC") 25 included in the communication terminal 10 and monitors its state. The network interface managing portion 24 registers into the network interface information table 22 information obtained on the NIC 25 (for example, the transmission speed (specification value), the fee, the IP address, the communication card standard, MTU (Max Transfer Unit)).

The network interface managing portion 24 monitors the state where an NIC is newly added to the communication terminal 10, the state where an NIC is removed, and the state where an NIC becomes available or unavailable, and the portion 24 always updates the network interface information table 22. An example of the network interface information table 22 is shown in FIG. 6. The network interface managing portion 24 obtains items listed in FIG. 6 from device information of the NIC every time the state of the NIC varies.

The transmission path state managing portion 23 detects transmission paths available between the terminal 10 and the communication counterpart based on the NIC information obtained by the network interface managing portion 24, and the portion 23 further obtains the transmission path state (for example, the bottleneck physical bandwidth, the available bandwidth, the RTT delay difference, the packet loss rate) for each of the detected transmission paths, and registers this state into the transmission path information table 21. When the NIC information is updated, the transmission path state managing portion 23 detects paths and obtains the transmission path information for each updating of the NIC information. However, for the above processing, the transmission path information may be newly obtained only for the updated paths.

The transmission path managing portion 18 selects the optimal transmission path for the application based on the transmission path information obtained by the above described transmission path state managing portion 23 and the application request information (for example, the requested band, the requested delay, the fee, the priority transmission path) received from the application portion 11. As for the selection result, whichever will do, selecting one transmission path optimal for the application or by obtaining the priority of each transmission path and having the communication counterpart select one transmission path. After selecting the transmission path, the transmission path managing portion 18 transfers to the application portion 11 the transmission path state (the bandwidth, the delay, the packet loss rate, etc.) of the selected transmission path.

The contents control portion 14 selects the contents type that can be transmitted and received by referring to the quality information table 16 based on the transmission path state transferred from the transmission path managing portion 18. The contents type here refers to, for example, the bit rate of video images/sound, the type of codec, image angle, frame, etc., for video image streaming and the type of codec for VoIP (Voice over Internet Protocol).

The communication control portion 13 starts to provide a service after negotiating with the communication counterpart for transmission/reception of data of the contents type selected as described above. The portion 13 also transmits and receives the application information (the waiting port number, the available codec type, etc.) to/from the communication counterpart. The common service quality that can be provided by the application can be obtained by transmitting/receiving the above information.

The user setting portion 12 is an input/output portion with which a user makes settings of the communication terminal, and makes settings and operation of the application priority criteria table 15. The user setting portion 12 comprises a screen, a button, a mouse, etc. The functions of the application portion 11 are also controlled by execution of a command that is designated by the user.

The IP control portion 20 sets address information, etc., necessary for transmitting data to the IP network (FIGS. 1 and 2) and transmits and receives the created data to/from an actual network through the NIC 25. The communication terminal 10 is connected to the network and can move around maintaining the connection to the network.

In the above described communication terminal 10, when the communication terminal is started up, the network interface managing portion 24 obtains information on the attribute of multiple network interfaces (for example, the name of a communication card, the transmission speed, the radio wave intensity, the state of links, the modulation method). Concurrently, the portion 24 detects network interfaces that can communicate, and registers these network interfaces into the network interface information table 22. As for the method of detecting the network interfaces determination by comparison between the radio wave intensity and a threshold value, variation of the state of the links, etc. are given.

After the communication terminal 10 is started up, the network interface managing portion 24 monitors addition deletion of network interfaces and availability and unavailability for communication of network interfaces, thereby, detects that the state of communication is varied, and updates the network interface information table 22 for every detection. When the application starts communication, the communication terminal 10 and the communication counterpart thereof notify each other of available contents information and, thereby, the communication terminal 10 obtains the information on the available contents, registers this information into the quality information table 16, and registers this information into the application priority criteria table 15 together with the information of the priority criteria of the application set in advance (the requested bandwidth, the lowest requested bandwidth, permissible delay, etc.).

The network interface managing portion 24 refers to the network interface information table 22 and transmits the information of NICs ready for communication to the communication counterpart. The communication terminal that received the information refers to the transmitted information on the NICs and its network interface information table 22 and extracts transmission channels (paths) exist between the terminals. For each of the extracted paths, the state of the transmission path (such as bottleneck bandwidth and the RTT delay difference) is obtained and registered in each transmission path information table 21.

The transmission path selecting portion 19 filters the data in the transmission path information table 21 using the application priority criteria table 15 and, thereby, selects a transmission path that is optimal for the request of the application. For example, when video image streaming is started up as the application, a band is set as a priority criterion and, therefore, a transmission path having the broadest bandwidth is selected. In this case, an NIC having a different transmission path respectively for the uplink and downlink communication may be selected according to the priority criterion. The transmission path selecting portion 19 may not select one transmission path, however, it gives the relative priority to the transmission path and cause the communication counterpart to determine the transmission path, by notifying the counterpart of the priority.

When the transmission path is selected, the transmission path selecting portion 19 refers to the transmission path information table 21 about the transmission path information of the selected transmission path, and transmits the information to the contents control portion 14. The contents control portion 14 determines the quality of the contents from the quality information table 16 based on the received transmission information. The communication control portion 13 starts transmission/reception of the determined contents and, concurrently, the IP control portion 20 switches the existing transmission path to the transmission path selected by the transmission path selecting portion 19.

Due to the execution of the above processing, data communication of the selected contents is executed through the determined transmission path, and linkage between the switching of the transmission path and the application is realized.

When the network interface managing portion 24 detects that the state of the NIC 25 has varied, the portion 24 registers information of a newly obtained NIC 25 into the network interface information table 22 or deletes registered information therein, and transmits the updated information of the NIC 25 to the communication counterpart. The communication terminal that received the updated information refers to the updated information of the NIC 25 and its network interface information table 22, and detects transmission paths present between the communication terminals.

When a transmission path is added, the state of each transmission path (such as the bottleneck bandwidth and the RTT delay difference) of the newly extracted transmission paths are obtained and registered in each of the transmission path information table 21, and a transmission path is selected again in the same manner as that at the start of the communication. When this transmission path is used in two-way communication, priority of each of the transmission paths is determined for each of the uplink and the downlink communication, transmission paths having the highest priority respectively for the uplink and the downlink communication are determined, and the data communication is executed through the determined transmission paths. When a communication session through another transmission path is already established, switching of each of the transmission paths is executed maintaining the communication session.

FIG. 4 is an operation sequence chart showing operations respectively of portions when the communication terminal 10 shown in FIG. 3 starts communication. FIG. 5 is a chart showing an operation sequence when the state of communication of the NIC 25 is varied. Description will be given for the operation sequence when the communication is started. In FIG. 4, the own terminal 26 is a communication terminal on the transmission side to start the communication, and the communication counterpart terminal 27 represents a communication terminal on the reception side for the communication terminal on the transmission side. It is assumed that each of the communication terminals includes multiple network interfaces that can be connected to an IP network 28. It is also assumed that the communication terminals execute data communication for communication by video image and sound through the wireless access points or the wireless base stations described referring to FIGS. 1 and 2.

The form of connection may be one-to-one or a communication form such as a multi-point conference communication for multiple attendees. As to the data communication, server-client-type one-way communication or two-way communication such as a telephone system may be allowed. In FIG. 5, the terminal 26 is the communication terminal that detected the variation of the state of the communication of the NIC and the communication counterpart terminal 27 is the communication terminal with which the terminal 26 is being in communication. In this case, the terminal 26 and the communication counterpart terminal 27 may be the terminal on the transmission side and that on the reception side or vice versa. As to the form of communication, the same form as that of the communication terminal shown in FIG. 4 can be said to be taken. As to each of the communication terminals, one or both communication terminal(s) may include only one NIC.

Referring to FIG. 4 (see also FIG. 3), description will be given for operations of each portion of the terminal 26 and the communication counterpart terminal 27 at the start of the communication when the communication terminals execute data communication by an application using communication by video images and sound, etc. For example, when the transmission path managing portion 18 is installed as a middleware used by an application program, the network interface managing portion 24 obtains information on the attributes of an NIC included in the terminal 26 (for example, the name of the communication card, the transmission speed, the radio wave intensity, the state of links, the modulation method, MTU) when the program is started up.

At the same time when the information is obtained, the network interface managing portion 24 detects an NIC that is available for communication and registers the NIC into the network interface information table 22 (S401). After this registration: the network interface managing portion 24 always monitors the state of the communication of the NIC; when the state varies, executes writing, for every variation, to the items of the network interface information table 22 which are updated; and notifies the transmission path managing portion 18 only of the items in which the variations occurred. FIG. 6 lists the above items to be registered in the network interface information table 22 and an example of values thereof.

As for the method of detecting an NIC, determination by comparison between the radio wave intensity and a threshold value, the state of links, etc. can be considered. An example of the detection using the radio wave intensity can be that, when the radio wave intensity is equal to or higher than Level 13 for a threshold value defined as Level 13, "one" as a flag is written at the position of a link state flag in the network interface information table 22 (when the network interface is available, the flag is "one" and, when the network interface is unavailable, the flag is "zero").

On the other hand, when the radio wave intensity is lower than Level 13, a link state flag "zero" is written at the same position as above. The threshold value may be determined by the application, included in advance in the communication terminal, or set by a user through the user setting portion 12. According to the threshold value of the example, the network interface managing portion 24 does not change the link state flag even when the portion 24 detects that the radio wave intensity varied from Level 11 to Level 12.

An example of detection by the link state can be that: some NICs for a portable telephone, a PHS, etc., may not establish a connection to an IP network without establishing dial-up connection. When a dial-up connection is established, a flag indicating "ON" is written at the position of the link state in the network interface information table 22; and, when no dial-up connection is established, a flag indicating "OFF" is written at the position. As to the start up timing of the transmission path managing portion 18, this portion 18 may have been started up at any time before the application starts communication, at the time when the communication terminal 10 is started up or when the application is stared up. Even when the transmission path managing portion 18 is included in the application, the start up timing of the transmission path managing portion 18 may be the same as that described above.

The application portion 11 receives from the user setting portion 12 a communication start request from a user, and the terminal 26 and the communication counterpart 27 mutually notify each other of the information necessary for data communication by the application (S414). In this case, an example of items of the information that is mutually notified of is shown in FIG. 7(A). In FIG. 7(A), the connection information necessary for the data transmission and reception includes: "connection destination IP address"; waiting "port number" and "session ID" necessary for session control of the communication, etc.; "video image/sound coding parameters (the type of available codec, etc.)"; and "transmission/reception protocol (RTP: Real-time Transport Protocol, UDP: User Datagram Protocol, etc.)" used.

A signaling protocol to start, manage, and end the sessions such as SIP (Session Initiation Protocol) and RTSP (Real Time Streaming Protocol) may be used as the above negotiating function. The IP address may be an IPv4 (Internet Protocol Version 4) address or an IPv6 (Internet Protocol Version 6) address.

The application portion 11 creates the quality information table 16 that is a list of information on the contents that the application can provide based on the contents information of the information obtained by the above negotiating function. The items in the quality information table 16 and an example thereof are shown in FIG. 7(B). For the quality information table 16, a table set by a user from the user setting portion 12 may be used.

The application portion 11 notifies the transmission path managing portion 18 of the information on the application priority criteria table 15 necessary for selecting transmission paths (S415, S416). The items in the priority criteria table 15 and an example thereof are shown in FIG. 7(C). The items of the application priority criteria table 15 include those written from the information obtained by the above negotiating function and the items set by a user from the user setting portion 12. For the application priority criteria table 15, the items set by a user from the user setting portion 12 may be used for all the items.

The transmission path managing portion 18 notifies the communication counterpart terminal 27 of the list of NICs available for communication referring to the link state flags in the network interface information table 22 (S417). The items in the network interface list and an example thereof are shown in FIG. 8(A). The communication counterpart terminal 27 creates a list of the transmission paths present between the terminal and the communication counterpart terminal based on the received network interface list and the network interface information table 22 in the own terminal.

For example, when the available NICs of the terminal 26 are three (NIC1 to 3) and the available NICs of the communication counterpart terminal 27 are two (NIC4 and 5), the number of transmission paths present between the terminal 26 and the communication counterpart terminal 27 is 12, that is obtained as three (the number of NICs of the terminal 26)×two (the number of NICs of the communication counterpart terminal 27)×two (an uplink transmission path and a downlink transmission path). An example of a transmission path list in this example is shown in FIG. 8(B). The created transmission path list is communicated from the communication counterpart terminal 27 to the terminal 26 and is registered in the transmission path information table 21 of each of the terminals (S404, S406), and is communicated of to the transmission path state managing portion 23 of each of the terminals (S418, S419). The transmission path state managing portion 23 measures the transmission path state of each transmission path based on the communicated information (S420).

The items in the transmission path information table 21 are shown in FIG. 9(A). Description for and an example of a method of measuring each of the items will be given below. FIG. 9(B) shows the overview of a bottleneck physical bandwidth. FIG. 9(B) shows one of the transmission paths between the own terminal 26 and the communication counterpart terminal 27 and the width of the line indicates the magnitude of the bandwidth, indicating a wider bandwidth when the width of the line becomes wider and a narrower bandwidth when the width of the line becomes narrower. Because various transmission paths are present in the course of a route in an IP network, a uniform bandwidth can not be provided throughout the transmission path. Therefore, by measuring the bandwidth of the bottleneck of the transmission path and determining the quality of the contents based on the result of the measuring, high quality services can be provided at the highest bit rate with which data can be transmitted and received through the transmission path.

Referring to FIG. 9(C), description will be given for a measuring method using a probe packet in a packet pair transferring method and a packet train transferring method as an example of the method of measuring the physical bandwidth of a bottleneck link. Two packets, each being the same size S, are transmitted from the terminal 26 being kept closely adjacent to each other, and when these packets are simultaneously queued in a bottleneck link, $\Delta T < S/B2$ is obtained. Because the packets arrive at the communication counterpart terminal 27 maintaining the interval between the packets, $\Delta T' = S/B2$ is obtained. B2 obtained from this equation is the bottleneck physical bandwidth in a transmission path.

Figure 10:
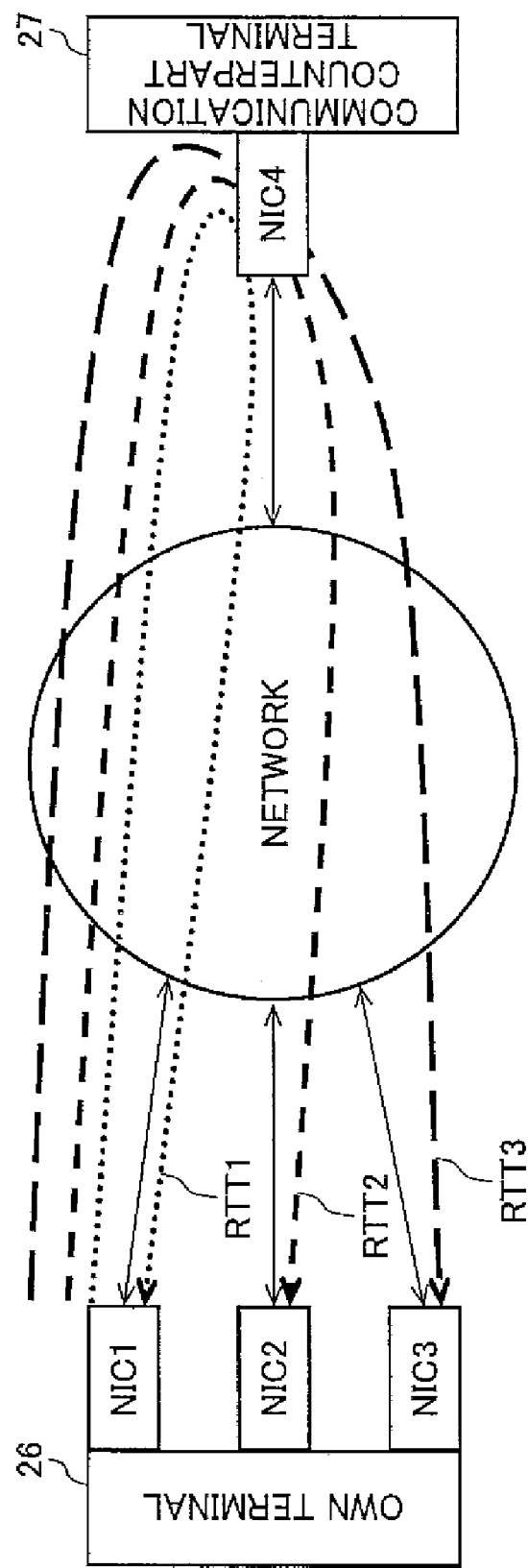
FIG. 10 shows an example of a method of measuring RTT delay difference in the embodiment.

An example of a method of measuring the RTT delay difference is shown in FIG. 10. In FIG. 10, it is assumed that the terminal 26 includes three NICs of NIC1 to 3 and the communication counterpart terminal 27 includes NIC4, and those NICs are respectively connected to IP networks. Because the RTT can be measured by transmitting a packet from the terminal 26 to the communication counterpart terminal 27 and again to the terminal 26, the RTT of NIC1-NIC4-NIC1 is denoted by "RTT1", the RTT of NIC1-NIC4-NIC2 is denoted by "RTT2", the RTT of NIC1-NIC4-NIC3 is denoted by "RTT3", the delay time in one way of NIC1 to NIC4 is denoted by $\Delta T$, the delay time in one way of NIC4 to NIC1 is denoted by $\Delta T1$, the delay time in one way of NIC4 to NIC2 is denoted by $\Delta T2$, and the delay time in one way of NIC4 to NIC3 is denoted by $\Delta T3$. Therefore, $$\Delta T1 = RTT1 - \Delta T,$$

$$\Delta T2 = RTT2 - \Delta T, \text{ and}$$

$$\Delta T3 = RTT3 - \Delta T$$

are obtained.

From the above equations, $\Delta T1$, $\Delta T2$, $\Delta T3$ can be obtained by respectively subtracting $\Delta T$ from RTT1, RTT2, and RTT3. Therefore, comparing RTT1, RTT2, and RTT3 can be considered to be synonymous with comparing relative delay differences of one way from the communication counterpart terminal 27 to the terminal 26. From the above, RTT1, RTT2, and RTT3 can be used as the delay differences respectively of one ways of NIC4 to NIC1, of NIC4 to NIC2, and of NIC4 to NIC3.

Figure 11:
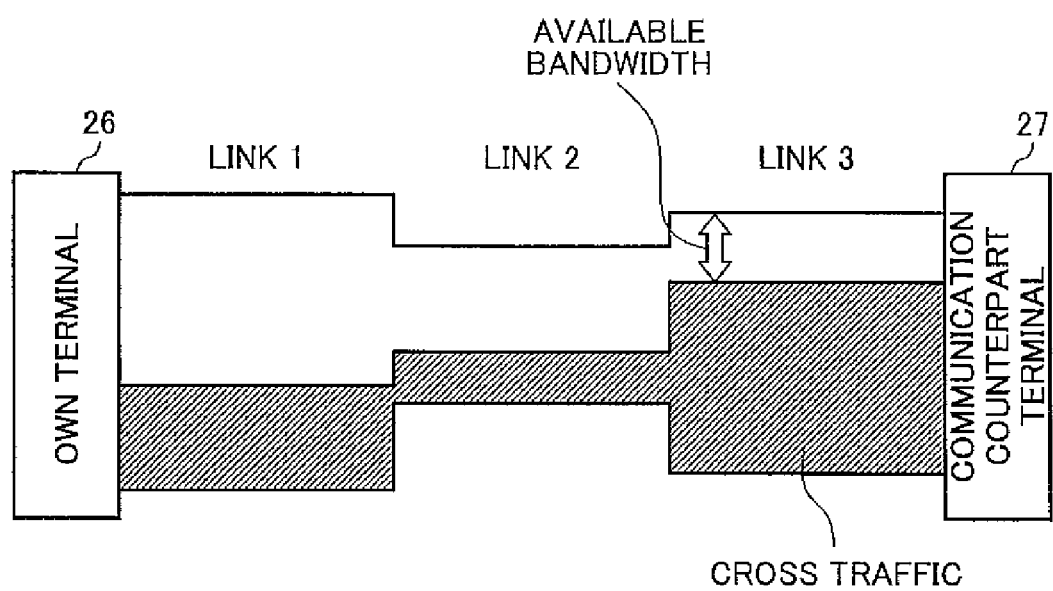
FIG. 11 shows an overview of an available bandwidth in the embodiment.

FIG. 11 is a diagram explaining an available bandwidth and, similarly to FIG. 9(B), FIG. 11 shows one of the transmission paths between the terminal 26 and the communication counterpart terminal 27, and the width of the line indicates the magnitude of the bandwidth, indicating a wider bandwidth when the width of the line becomes wider and a narrower bandwidth when the width of the line becomes narrower. The hatched portion shows that packets already being transmitted or received on the transmission path occupy a band of each link (cross traffic is present in each link).

In this case, similarly to the above measurement of the bottleneck physical bandwidth, the available bandwidth of the links on a transmission path between a transmitting terminal and a receiving terminal can be measured by using the packet train method for the transfer of the probe packet. In this case, using the trend of increase of the one-way transfer delay between probe packets, the trend of increase of the one-way transfer delay is observed when the transmission rate of a probe packet exceeds the available bandwidth, and therefore, using this characteristic, the available bandwidth can be obtained by repeatedly executing measurement changing the transmission rate of the probe packet. The packet loss rate can be obtained from "packet loss rate=the number of packet losses/the number of transmitted packets" by using the probe packet used in the above measurement.

The above measurement is executed for a transmission path list (all the transmission paths present between the terminal 26 and the communication counterpart terminal 27) registered in the transmission path information table 21. After the measurement was completed, the transmission path state managing portion 23 writes the transmission path information obtained in the above measurement method into the transmission path information table 21 (S406, S407). The transmission path selecting portion 19 selects a transmission path from the above obtained transmission path information table 21 and the application priority criteria table 15 (S408, S409).

Figure 12:
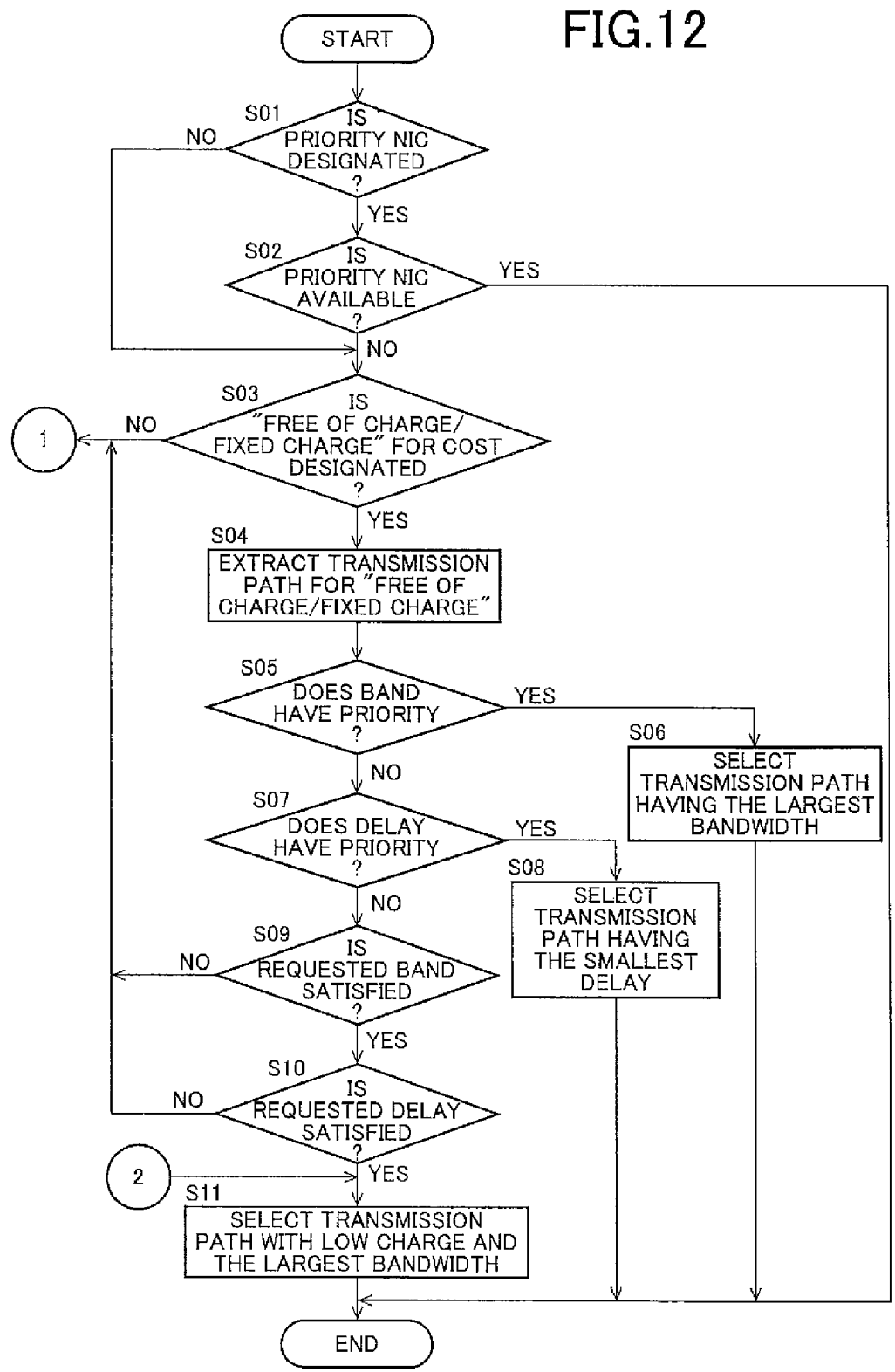
FIG. 12 is a flowchart of an example of a processing procedure of selection of a transmission path in the embodiment.

FIGS. 12 and 13 are flowcharts each showing an example of a processing procedure of selecting a transmission path suitable for the request of the application from the transmission path information table 21 and the application priority criteria table 15. As shown in FIG. 12, whether an item for a priority NIC is designated in the application priority criteria table 15 is checked (S01). When a priority NIC is designated (S01 Yes), whether the designated priority NIC is present in the table and is available is checked by referring to the transmission path information in the transmission path information table 21 (S02) and, when this priority NIC is available, the priority NIC is selected (S02 Yes).

When the item for a priority NIC is not designated in the application priority criteria table 15 (S01 No), or when the priority NIC is not available (S02 No), whether the item for the cost priority is designated in the application priority criteria table 15 is checked (S03). In the embodiment, it is assumed that either of "free of charge system or fixed charge system" and "measured charge system" is set as the item of the fee setting. When "free of charge/fixed charge system" is designated as the fee priority (S03 Yes), a transmission path employing the "free of charge/fixed charge system" is extracted by referring to both of the network interface information table 22 and the transmission path information table 21 (S04).

When the band priority is further set in the application priority criteria table 15 (S05 Yes), a transmission path having the largest bandwidth is selected from the above extracted transmission paths (S06). When the item for the band priority is not set (S05 No), whether the item for the delay priority is set is checked. When this item is set (S07 Yes), a transmission path having the smallest delay is selected from the above extracted transmission paths (S08). When the item for the delay priority is also not set (S07 No), whether the extracted transmission paths satisfy the requested band and requested delay is checked. When some transmission paths are present that satisfy both of these conditions (S09 Yes, S10 Yes), a transmission path with the lowest cost and having the largest bandwidth is selected from these transmission paths (S11).

When the extracted transmission paths can not satisfy either one of the requested band or the requested delay (S09 No, S10 No), the procedure is moved to the flow of FIG. 13 and the same procedure as the above process procedure is taken for transmission paths employing the measured charge system and a transmission path is selected (S12 to S22). When the cost priority is not set in the application priority criteria table 15 (S03 No), the same processing procedure is also taken and a transmission path is selected (S12 to S22).

However, when both of the band priority and the delay priority are not set in the application priority criteria table 15 (S14 No, S16 No) and no transmission path that satisfies the requested band is present (S19 No), the fact that no transmission path that satisfies the requested bandwidth is present is communicated to the user setting portion 12 (S21) and the fact that any service can not be provided is communicated to the user. Even in the case where the requested band is satisfied (S19 Yes), when the requested delay is not satisfied (S20 No), the fact that no transmission path that satisfies the requested delay is present is communicated to the user setting portion 12 (S22) and the fact that any service can not be provided is communicated to user. When the requested delay can be satisfied (S20 Yes), the procedure returns to the flow of FIG. 12 and a transmission path with the lowest cost and having the largest bandwidth is selected (S11).

As to transmission paths, uplink transmission paths and downlink transmission paths are present and, therefore, it is assumed in the embodiment that each terminal (of the terminal 26 and the communication counterpart terminal 27) executes a selection for the downlink transmission path. For the server-client-type one-way communication such as video image streaming and voice streaming, it is assumed that the client side selects the transmission path. Without limiting to the embodiment, the processing may be executed such that each terminal selects an uplink transmission path but a downlink transmission path, or one terminal selects both of an uplink and a downlink transmission paths.

Referring to FIG. 14(A), description will be given for an example of the case where different transmission paths are selected respectively for the uplink and the downlink. The terminal 26 includes two NICs respectively for FOMA and PHS. The communication counterpart terminal 27 includes an NIC only for a wireless LAN (IEEE802.11b). Each of the terminals can be connected to an IP network through each NIC. In the embodiment, it is assumed that FOMA employs the measured charge system and communicates at 384 kbps for the downlink and at 64 kbps for the uplink. PHS employs the fixed charge system and communicates at 11 Mbps for the uplink and the downlink. In this case, the network interface information table 22 and the transmission path information table 21 for each terminal are respectively as shown in FIG. 14(B) and FIG. 14(C).

Assuming that no priority NIC is set, the band priority is set, and the measured charge system is set for the change, as the application priority criteria, the application priority criteria table 15 becomes as shown in FIG. 15. As shown in FIG. 14(C), in the embodiment, the transmission paths present between the terminal 26 and the communication counterpart terminal 27 are four. When a transmission path is selected according to the above flowchart (FIG. 12) for selecting a transmission path, no priority NIC is designated (S01 No), free of charge/fixed charge system for the cost is not designated (S03 No) for the transmission path from the terminal 26 to the communication counterpart terminal 27, and the procedure is moved to the flow of FIG. 13.

In the flow of FIG. 13, because the band priority is designated (S14 Yes), the bandwidths of the transmission path 1 and the transmission path 2 are equal-sized, and transmission paths each having the same band are present (S13 Yes), the "transmission path 2" is selected as a transmission path with the lowest cost (S17). Similarly, as to the transmission path from the communication counterpart terminal 27 to the terminal 26, no priority NIC is designated (S01 No), free of charge/fixed charge system is not designated for the cost (S03 No), and the band priority is designated (S14 Yes) in the flow shown in FIGS. 12 and 13 for the transmission path, and the bandwidth of the transmission path 3 is larger compared to that of the transmission path 4 (S13 No). Therefore, the "transmission path 3" is selected as a transmission path having the largest bandwidth (S12).

In the case where the band priority is not designated (S14 No) and the delay priority is set (S16 Yes), when transmission paths having the same delay are present (S15 Yes), a transmission path with the lowest cost is selected (S17). When no transmission paths having the same delay are present (S15 No), a transmission path having the smallest delay is selected (S18).

As described above, each of the uplink and the downlink transmission paths selects a different NIC corresponding to the priority criteria of the application and the state of transmission paths and, thereby, it becomes possible to use each suitable transmission path according to the application and the preference of a user. The transmission path selecting portion 19 may not select one transmission path but may give each of the transmission paths a relative priority (may execute weighting to each of the items, and based on the weighting result, may calculate points to each transmission path, and may put priority to the transmission paths in the descending order of the points thereof, etc.), may notify the communication counterpart of the priority, and may cause the communication counterpart to determine a transmission path.

Returning to FIGS. 3 and 4, when the transmission path is selected, the transmission path selecting portion 19 refers to the transmission path information table 21 and notifies the application portion 11 of the transmission path information of the selected transmission path (S421, S422). In the embodiment, the transmission path selecting portion notifies the application portion 11 of the bandwidth (the bottleneck physical bandwidth) that can be assigned to the application as the state of the transmission path. Though the bandwidth accounts for a large part of the factors for determining the quality of the contents of the application, the possibility that information on the delay of the transmission path, the available bandwidth, the packet loss rate, etc., is required can be considered depending on the target contents. Therefore, any one of the information described above may be reported together as the occasion demands.

The contents control portion 14 refers to the quality information table 16 based on the reported information on the transmission path and determines the quality of the contents for the communication (S412, S413). As described above, the communication control portion 13 exchanges with the communication counterpart the information to determine the type of the video image/sound and the parameters for use according to the quality of the contents determined by the contents control portion 14 and, thereafter, starts the transmission and reception of data (S423) at the same time, and the IP control portion 20 switches the transmission path to a transmission path selected by the transmission path selecting portion 19 (S410, S411).

As above, when the communication terminal 10 executes the data communication by the application using the communication of the video image/sound through the wireless environment, a transmission path is selected according to the priority of the application and the preference of the user based on the information on the transmission path between the communication terminals and, thereby, it becomes possible to provide services that have the quality corresponding to the wireless environment and the information on the network of the place of the presence of each of the communication terminals. The transmission path may not only be realized by wireless but also be a medium that can be connected to an IP network such as a connection by a wired LAN represented by Ethernet (a registered trademark).

Referring to FIG. 5, description will be given for an example of the operation of each portion of the terminal 26 and the communication counterpart terminal 27 when the state of the communication of the transmission path surrounding the communication terminals is varied in the case where the communication terminal 10 executes the data communication by the application using communication by video images/sound, etc.

A user can move freely utilizing the advantage of wireless. In this case, assuming that, for example, during the move, etc., the network interface managing portion 24 detects that the radio wave intensity of an NIC that has been unavailable so far (the link state flag thereof has been indicating "zero") is strengthened and is varied from Level 12 to Level 14 and that the threshold value is set to Level 13, a network interface that has been unavailable becomes available. The network interface managing portion 24 notifies the transmission path managing portion 18 of the fact that the state of the NIC has varied (S517) and writes the reported value into a corresponding position in the network interface information table 22 (rewrites the link state flag from "zero" to "one") (S501).

The transmission path managing portion 18 notifies the communication counterpart terminal 27 of the information on the corresponding network interface that has newly become available (S518). An example of the information on the network interface reported of in this case is shown in FIG. 16(A). An example for the start of the communication (the available NICs of the terminal are three (NIC1 to 3) is shown here, and the available NICs of the communication counterpart terminal are two (NIC4 and 5)), when NIC6 of the terminal 26 becomes available, an IP address that corresponds to NIC6 that is the name of the NIC to be added is transmitted.

When multiple added network interfaces are present, a list of IP addresses that correspond to the names of NICs is transmitted. In this case, each of the IP addresses may be either an IPv4 address or an IPv6 address. The list may be transmitted not only to the added network interface but also to all the network interfaces that can be communicated. The communication counterpart terminal 27 creates a list of transmission paths that an added between the terminal 26 and the communication counterpart terminal 27 based on the received network interface information and the network interface information table 22 in the terminal 27 itself.

When the transmitted network interface information is a list of all the network interfaces that can be communicated, a list of transmission paths present between the terminal 26 and the communication counterpart terminal 27 is created. An example of the list of the added transmission paths is shown in FIG. 16(B). The created list of the transmission paths is communicated from the communication counterpart terminal 27 to the terminal 26 and is registered in the transmission path information table 21 of each of the terminals (S503, S504) and is communicated to the transmission path state managing portion 23 of each of the terminals (S519, S520).

The transmission path state managing portion 23 measures the state of the transmission path for the added transmission path based on the reported information (S521). As to the description of each item and the method of measurement, the same method as the method described in the example for the start of the communication is used. From the information on the transmission path and the application priority criteria obtained as described above, a transmission path is determined according to the flowchart shown in FIGS. 12 and 13 (S507, S508). When the determined transmission path is different from the transmission path currently used (S509 Yes, S510 Yes), the transmission path selecting portion 19 refers to the transmission path information table 21 and notifies the application portion 11 of the information on the transmission path of the selected transmission path (S522, S523).

In the embodiment, similarly to the embodiment for the start of the communication, the transmission path selecting portion 19 notifies the application portion 11 of the bandwidth that can be assigned to the application as the state of the transmission path. The contents control portion 14 refers to the quality information table 16 based on the notified information on the transmission path and determines the quality of the contents for the communication. When the contents control portion 14 determines that switching of the contents is needed (S513 Yes, S514 Yes), the communication control portion 13 exchanges with the communication counterpart the information to determine the type of the video images/sound and the parameters for use according to the quality of the contents determined (S524) and, thereafter, starts the transmission and reception of data with the quality of the contents after the switching (S515, S516) and at the same time, the IP control portion 20 switches the transmission path to a transmission path selected by the transmission path selecting portion 19 (S511, S512).

When the selected transmission path coincides with the transmission path currently used, nothing is executed. When the selected transmission path is different from the transmission path currently used and the contents control portion 14 determines that the contents need not to be switched (S513 No, S514 No), only the switching of the transmission path is executed (S511, S512).

An example of the variation of the radio wave intensity is mentioned in the above embodiment. However, when the state where a dial-up connection of the portable telephone PHS, etc., is not established is shifted to the state where the connection is established (the state of the link is varied from "OFF" to "ON"), or the case where a network interface is newly added and the network interface has the link state that is "ON" or a link state flag that is "one" may be employed.

As above, in the case where a network interface newly becomes available triggered by the variation of the wireless environment while the communication terminal 10 is executing data communication by the application using communication of video images, sound, etc., through the wireless environment, a transmission path is again selected according to the information on the transmission path between the communication terminals, the priority criteria of the application, and the preference of a user, and the information based on the transmission path is communicated to the application. Thereby, it becomes possible to provide the services corresponding to the wireless environment and the network state of the place where the communication terminal 10 exists. The transmission path may not only be realized by wireless but also be a medium that can be connected to an IP network such as connection by a wired LAN represented by Ethernet (a registered trademark).

Referring also to FIG. 5, description will be given for another example of the operation of each portion of the terminal 26 and the communication counterpart terminal 27 when the state of the communication of the transmission path surrounding the communication terminals is varied in the case where the communication terminal 10 executes the data communication by the application, etc., using communication by video images/sound, etc.

A user can move freely utilizing the advantage of wireless. In this case, assuming that, for example, during the move, etc., the network interface managing portion 24 detects that the radio wave intensity of the network interface currently communicating with (the link state flag thereof indicates "one") is weakened and is varied from Level 14 to Level 12 and that the threshold value is set to Level 13, the network interface that has been available becomes unavailable. The network interface managing portion 24 notifies the transmission path managing portion 18 of the fact that the state of the network interface has varied (S517) and writes the reported value into a corresponding position in the network interface information table 22 (rewrites the link state flag from "one" to "zero") (S501).

The transmission path managing portion 18 notifies the communication counterpart of the information on the corresponding network interface that has become unavailable (for example, the name of the network interface) (S518) and at the same time, deletes the information on the corresponding transmission path from the transmission path information table 21 (S503). Similarly, the communication counterpart terminal 27 deletes the information on the corresponding transmission path from the transmission path information table 21 retained by the communication counterpart terminal 27 based on the reported information on the network interface (S504).

The transmission path state managing portion 23 determines a transmission path according to the flowchart shown in FIGS. 12 and 13 from the updated information on the transmission path and the application priority criteria (S507, S508). In this case, the transmission path state managing portion 23 may execute again the measurement of the state of the transmission path (for the transmission paths after deleting the transmission path corresponding to the network interfaces for which the above state has varied) based on the updated transmission path information table 21 (S519 to S521, S505, S506). When a transmission path to be newly used is determined, the transmission path selecting portion 19 refers to the transmission path information table 21 and notifies the application portion 11 of the information on the transmission path of the selected transmission path (S522, S523).

In the embodiment, similarly to the embodiment for the start of the communication, the transmission path selecting portion notifies the application portion 11 of the bandwidth that can be assigned to the application as the state of the transmission path. The contents control portion 14 determines the quality of the contents for communication based on the notified information on the transmission path by referring to the quality information table 16. When the contents control portion 14 determines that the contents need to be switched (S513 Yes, S514 Yes), the communication control portion 13 exchanges with the communication counterpart the information to determine the type of the video image/sound and the parameters for use according to the quality of the contents determined by the contents control portion 14 and, thereafter (S524), starts the transmission and reception of data and the IP control portion 20 simultaneously switches the transmission path to a transmission path selected by the transmission path selecting portion 19 (S511, S512). When the contents control portion 14 determines that the contents do not need to be switched (S513 No, S514 No), only the switching of the transmission path is executed (S511, S512).

In the embodiment, the description has been given for the control executed when the radio wave intensity of the network interface currently being used is weakened. However, in the case where the radio wave intensity of a network interface that is not used currently and is currently available is weakened, information on this network interface that has become unavailable may also be communicated to the communication counterpart terminal 27. The same processing is executed for the control procedure of deleting corresponding information in the transmission path information table 21 respectively by each of the terminal 26 and the communication counterpart terminal 27 and, in this case, this procedure only differs in that the selection of a transmission path is not executed.

The example of variation of the radio wave intensity has been mentioned in the above embodiment. However, the case where the state where a dial-up connection of the portable telephone PHS, etc., is established is shifted to the state where the connection is not established (the state of the link is varied from "ON" to "OFF"), the case where a network interface is deleted (that is, the network interface is removed from the communication terminal), and the case where the link state flag of a network interface is shifted from "one" to "zero" may be employed for the embodiment.

As above, in the case where the state of the transmission path currently used is varied triggered by the variation of the wireless environment while the communication terminal 10 is executing data communication by the application using communication of video images, sound, etc., through the wireless environment, a transmission path can be again selected according to the information on the transmission path between the communication terminals, the priority criteria of the application, and the preference of a user, and the information based on the transmission path is communicated of to the application. Thereby, it becomes possible to provide the services corresponding to the wireless environment and the network state of the place where the communication terminal 10 exists. The transmission path may not only be realized by wireless but also be a medium that can be connected to an IP network such as a connection by a wired LAN represented by Ethernet (a registered trademark).

Similarly referring to FIG. 5, description will be given for another example of the operation of each portion of the terminal 26 and the communication counterpart terminal 27 when the state of the communication of the transmission path surrounding the communication terminals is varied in the case where the communication terminal 10 executes the data communication by the application, etc., using communication of video images/sound, etc.

A user can move freely utilizing the advantage of wireless. In this case, it is assumed that, for example, during the move, etc., the network interface managing portion 24 detects variation of the physical link speed of the wireless communication of a network interface currently communicating (such as variation of the physical transmission speed in IEEE802.11b from 11 Mbps to 5.5 Mbps or variation of the transmission speed of a bearer in FOMA from 384 kbps to 64 kbps). The network interface managing portion 24 notifies the transmission path managing portion 18 that the state of the NIC has varied (S517) and the portion 18 writes the reported value (such as the transmission speed from 11 Mbps to 5.5 Mbps or 384 kbps to 64 kbps) into a corresponding position in the network interface information table 22 (S501).

The transmission path managing portion 18 notifies the communication counterpart terminal 27 of the information on the corresponding network interface of which communication state is varied (S518). An example of the information on the network interface to be reported is shown in FIG. 16(C).

And the embodiment for the start of the communication is shown in this case, the NIC1 is a network interface of IEEE802.11b and only the information for a portion to be updated in the network interface information table 22 indicating that the transmission speed of NIC1 of the terminal 26 has been varied from 11 Mbps to 5.5 Mbps (S518) is transmitted. When multiple network interfaces of which communication states are varied are present, a list of information of the update portion in the network interface information table 22 corresponding to the names of the NICs. Not only the updated portion but also a list of all the network interfaces that can be communicated may by transmitted.

The communication counterpart terminal 27 updates the network interface information table 22 in the terminal 27 based on the received information on the network interfaces. The transmission path state managing portion 23 measures the state of the transmission path of the corresponding transmission path (S521). In this case, only the state of the transmission path of the transmission path corresponding to the updated network interface is again measured. However, the state of the transmission path may be again measured for all the transmission paths. For the description of each of the items and a method of measurement, the same method as the method described in the embodiment for the start of the communication is used. A transmission path is determined according to the flowcharts shown in FIGS. 12 and 13 from the information on the transmission path and the application priority criteria obtained as above (S507, S508).

When the determined transmission path is different from the transmission path currently used (S509 Yes, S510 Yes), the transmission path selecting portion 19 refers to the transmission path information table 21 and notifies the application portion 11 of the information on the transmission path of the selected transmission path (S522, S523). In the embodiment, similarly to the embodiment for the start of the communication, the transmission path selecting portion 19 notifies the application portion 11 of the bandwidth that can be assigned to the application as the information on the transmission path.

The contents control portion 14 and determines the quality of the contents for the communication based on the notified information on the transmission path by referring to the quality information table 16. When the contents control portion 14 determines that the contents need to be switched (S513 Yes, S514 Yes), the communication control portion 13 exchanges with the communication counterpart the information to determine the type of the video image/sound and the parameters for use according to the quality of the contents determined and, thereafter (S524), starts the transmission and reception of data with the quality of the contents after the switching (S515, S516). At the same time, the IP control portion 20 switches the transmission path to a transmission path selected by the transmission path selecting portion 19 (S511, S512). When the selected transmission path is the same as the transmission path currently used, nothing is executed. When the selected transmission path is different from the transmission path currently used and the contents control portion 14 determines that the contents do not need to be switched (S513 No, S514 No), only the switching of the transmission path is executed (S511, S512).

In the embodiment, the description has been given for the case where the physical link speed of the wireless communication of a network interface is varied. However, in the case where the change of the modulation method of the wireless is detected (the modulation method in IEEE802.11b is changed from QPSK to BPSK), by executing the control according to the processing procedure described in the embodiment, services having the quality corresponding to the communication environment can be provided.

In the embodiment, the description has been given for the case where the state of the communication of the terminal 26 is varied. However, for the case where the state of the communication of the communication counterpart terminal 27 is varied, by executing the same control as that described above, services having the quality that corresponds to the state of the communication of a user such as a linkage between the selection of the transmission path and the application can be provided.

The invention claimed is:

1. A communication system that includes a first communication terminal and a second communication terminal each having multiple network interfaces each capable of being connected to multiple transmission paths, and the communication system executes communication between the first communication terminal and the second communication terminal using any one of the transmission paths, comprising:

a means for transmitting information on the multiple network interfaces provided in the second communication terminal;

a means for creating a transmission path list that shows combinations of the multiple transmission paths to which the first communication terminal is connected and the multiple transmission paths to which the second communication terminal is connected based on the information on the multiple network interfaces that the first communication terminal provides and the information on the multiple network interfaces that the second communication terminal provides;

a means for selecting at least one combination from the transmission path list as a route of data communication between the communication terminals;

a means for transmitting the information from the first communication terminal to the transmission path, by designating any one of the network interfaces that the second communication terminal that is a communication counterpart provides as a destination and by designating any one of the network interfaces that the first communication terminal provides as a transmission origin;

a means for transmitting the information to the second communication terminal using a transmission path connected to a network interface designated as the destination;

a means for transmitting a probe packet to measure the state of the transmission path from the first communication terminal;

a means for controlling to transmit to the probe packet to each of multiple combinations being composed of the multiple transmission paths connected to the first communication terminal and the multiple transmission paths connected to the second communication terminal;

a means for obtaining the state of the transmission path for each of the combinations of the multiple transmission paths using the probe packet;

the second communication terminal comprises:

a means for receiving the probe packet transmitted from the first communication terminal;

a means for measuring the interval of each arrival of the probe packet received from the first communication terminal;

a means for calculating a bottleneck physical bandwidth from the measured arrival interval and the packet size of the probe packet; and a means for reporting the bottleneck physical bandwidth as the information indicating the state of the measured transmission path to the first communication terminal.

2. The communication system of claim 1, wherein the means for transmitting the same-sized probe packets adjacent to each other.

3. The communication system of claim 1, further comprising:
a means for selecting any one of the combinations of the transmission paths based on priority to each parameter included in the information indicating the state of the transmission path; and
a means for setting the priority for each application that executes communication.

4. The communication system of claim 1, wherein the system uses a different transmission path combination for each of a transmission path that is used to transmit information from the first communication terminal to the second communication terminal and a transmission path that is used to transmit information from the second communication terminal to the first communication terminal.

5. The communication system of claim 1, further comprising:
a means for detecting the change in the state of any one of the transmission paths, connected to the network interface provided in any one of the communication terminals, after the start of the communication between the first communication terminal and the second communication terminal including the paths that are not used for the communication; and
a means for changing the combination of the transmission paths to be selected from the transmission path list according to the detected variation of the state.

6. The communication system of claim 1, further comprising:
a means for detecting the change in the state of any one of the transmission paths connected to the network interface provided in any one of the communication terminals, after the start of the communication between the first communication terminal and the second communication terminal, including the paths that are not used for the communication; and
a means of changing the network interfaces provided in the second communication terminal designated as the destination to which the first communication terminal transmits information or the network interfaces provided in the first communication terminal that transmits information according to the detected variation of the state.

7. A communication terminal connected to a communication system that executes transmission and reception of information between communication terminals through different transmission paths, comprising:
multiple network interfacing means each connected to a different transmission path;
a means for receiving information of multiple network interfaces each connected to a different transmission path;
a means for creating a transmission path list that shows combinations of the multiple transmission paths to which a counterpart communication terminal is connected that are indicated by the information of the network interface received from the counterpart communication terminal, and multiple transmission paths to which multiple network interfacing means are connected;
a means for selecting at least one combination from the transmission path list;
a means for transmitting the probe packet to each of multiple combinations being composed of the multiple transmission path connected to the communication terminal and the multiple transmission paths connected to the counterpart communication terminal;
a means for obtaining the state of the transmission path for each of the multiple combinations of transmission paths using the probe packet;
a means for receiving the probe packet, communicated from the counterpart communication terminal;
a means for measuring the interval of each arrival of the probe packet received from the counterpart communication terminal;
a means for calculating a bottleneck physical bandwidth from the measured arrival interval and the packet size of the probe packet; and
a means for reporting the bottleneck physical bandwidth as the information indicating the state of the measured transmission path to the counterpart communication terminal.

8. The communication terminal of claim 7, further comprising
a means for selecting a combination of the transmission paths from the transmission path list and, according to the selection result, transmitting information from the communication terminal to the transmission path, by designating any one of the multiple network interfaces that the counterpart communication terminal provides as a destination and by designating any one of the multiple network interfaces that the communication terminal provides as the transmission origin.

9. The communication terminal of claim 7 or 8, further comprising:
a means for transmitting a probe packet to measure the state of the transmission path to the counterpart communication terminal;
a means for controlling to transmit of the probe packet to each of multiple combinations being composed of the multiple transmission path connected to the communication terminal and the multiple transmission paths connected to the counterpart communication terminal;
a means for receiving information, communicated from the counterpart communication terminal that indicates the state of the transmission path; and
a means for obtaining the state of the transmission path for each of the multiple combinations of transmission paths according to the received information indicating the state of transmission path.

10. The communication terminal of claim 7 or 8, further comprising
a means for receiving information from the counterpart communication terminal using a network interface connected to a transmission path that is different from the transmission path used to transmit the information to the counterpart communication terminal.

11. The communication terminal of claim 7, further comprising:
a means for detecting the change in the state of any one of the transmission paths connected to the network interface provided in either the communication terminal or the counterpart communication terminal, after the start of the communication with the counterpart communication terminal including the paths that are not used for communication; and a means for changing the combination of the transmission paths selected from the transmission path list according to the detected variation of the state.

12. The communication terminal of claim 8, further comprising:
   a means for detecting the change in the state of any one of the transmission paths connected to the network interface provided in either the communication terminal or the counterpart communication terminal, after the start of the communication with the second communication terminal including the paths that are not used for communication; and
   a means for changing the network interface provided in the counterpart communication terminal that is designated as the destination of the information or the network interface that transmits the information, according to the detected variation of the state.

13. A communication method in a communication system that includes a first communication terminal and a second communication terminal each having multiple network interfaces each capable of being connected to multiple transmission paths, and the communication system executes communication between the first communication terminal and the second communication terminal using any one of the transmission paths, the method comprising the steps of:
   transmitting information on the multiple network interfaces provided in the second communication terminal;
   creating a transmission path list that shows combinations of the multiple transmission paths to which the first communication terminal is connected and the multiple transmission paths to which the second communication terminal is connected based on the information on the multiple network interfaces that the first communication terminal provides and the information on the multiple network interfaces that the second communication terminal provides;
   selecting at least one combination from the transmission path list as a route of data communication between the communication terminals;
   transmitting the information from the first communication terminal to the transmission path, by designating any one of the network interfaces that the second communication terminal that is a communication counterpart provides as a destination and by designating any one of the network interfaces that the first communication terminal provides as a transmission origin;
   transmitting the information to the second communication terminal using a transmission path connected to a network interface designated as the destination;
   transmitting a probe packet to measure the state of the transmission path from the first communication terminal;
   controlling to transmit to the probe packet to each of multiple combinations being composed of the multiple transmission paths connected to the first communication terminal and the multiple transmission paths connected to the second communication terminal;
   obtaining the state of the transmission path for each of the combinations of the multiple transmission paths using the probe packet;
   receiving the probe packet transmitted from the first communication terminal;
   measuring the interval of each arrival of the probe packet received from the first communication terminal;
   calculating a bottleneck physical bandwidth from the measured arrival interval and the packet size of the probe packet; and
   reporting the bottleneck physical bandwidth as the information indicating the state of the measured transmission path to the first communication terminal.

14. The communication terminal according to claim 7, further comprising:
   a means for selecting any one of the combinations of the transmission paths based on priority to each parameter included in the information indicating the state of the transmission path; and
   a means for setting the priority for each application that executes communication.

15. The communication method according to claim 13, further comprising the step of:
   selecting any one of the combinations of the transmission paths based on priority to each parameter included in the information indicating the state of the transmission path; and
   setting the priority for each application that executes communication.

* * * * *